United States Patent
Bredno et al.

(10) Patent No.: US 12,293,517 B2
(45) Date of Patent: May 6, 2025

(54) SYSTEMS FOR CELL SHAPE ESTIMATION

(71) Applicant: Ventana Medical Systems, Inc., Tucson, AZ (US)

(72) Inventors: Joerg Bredno, Tucson, AZ (US); Konstanty Korski, Penzberg (DE); Oliver Grimm, Penzberg (DE)

(73) Assignee: VENTANA MEDICAL SYSTEMS, INC., Tucson, AZ (US)

( * ) Notice: Subject to any disclaimer, the term of this patent is extended or adjusted under 35 U.S.C. 154(b) by 0 days.

(21) Appl. No.: 18/497,974

(22) Filed: Oct. 30, 2023

(65) Prior Publication Data

US 2024/0078670 A1 Mar. 7, 2024

Related U.S. Application Data

(63) Continuation of application No. 16/949,030, filed on Oct. 9, 2020, now Pat. No. 11,842,483, which is a continuation of application No. PCT/EP2019/059181, filed on Apr. 11, 2019.

(60) Provisional application No. 62/657,509, filed on Apr. 13, 2018.

(51) Int. Cl.
 *G06T 7/00* (2017.01)
 *G06V 20/69* (2022.01)

(52) U.S. Cl.
 CPC .......... *G06T 7/0012* (2013.01); *G06V 20/695* (2022.01); *G06T 2207/10004* (2013.01); *G06T 2207/30024* (2013.01); *G06T 2207/30242* (2013.01)

(58) Field of Classification Search
 None
 See application file for complete search history.

(56) References Cited

U.S. PATENT DOCUMENTS

| | | | |
|---|---|---|---|
| 5,650,327 A | 7/1997 | Copeland et al. | |
| 5,654,200 A | 8/1997 | Copeland et al. | |
| 6,296,809 B1 | 10/2001 | Richards et al. | |
| 6,352,861 B1 | 3/2002 | Copeland et al. | |
| 6,827,901 B2 | 12/2004 | Copeland et al. | |
| 6,943,029 B2 | 9/2005 | Copeland et al. | |
| 11,842,483 B2 | 12/2023 | Bredno et al. | |
| 2003/0211630 A1 | 11/2003 | Richards et al. | |

(Continued)

FOREIGN PATENT DOCUMENTS

| | | |
|---|---|---|
| WO | 2011049608 A2 | 4/2011 |
| WO | 2014102130 A1 | 7/2014 |

(Continued)

OTHER PUBLICATIONS

EP Application No. 19721200.4, "Intention to Grant", Apr. 29, 2024, 9 pages.

(Continued)

*Primary Examiner* — Dov Popovici
(74) *Attorney, Agent, or Firm* — Kilpatrick Townsend & Stockton LLP

(57) ABSTRACT

Techniques described herein pertain to automated systems and methods for analyzing, storing, and/or retrieving information associated with biological objects including lymphocytes. In some embodiments, a shape metric is derived for each detected and segmented lymphocyte and the shape metric is stored along with other relevant data.

20 Claims, 13 Drawing Sheets
(9 of 13 Drawing Sheet(s) Filed in Color)

(56) References Cited

U.S. PATENT DOCUMENTS

| | | | |
|---|---|---|---|
| 2004/0052685 | A1 | 3/2004 | Richards et al. |
| 2016/0196465 | A1 | 7/2016 | Wu et al. |
| 2016/0363593 | A1 | 12/2016 | Sebastiao et al. |
| 2017/0091937 | A1 | 3/2017 | Barnes et al. |
| 2017/0103521 | A1 | 4/2017 | Chukka |
| 2017/0140246 | A1 | 5/2017 | Barnes et al. |
| 2017/0154420 | A1 | 6/2017 | Barnes et al. |
| 2017/0270666 | A1 | 9/2017 | Barnes et al. |
| 2017/0337596 | A1 | 11/2017 | Larkin |
| 2017/0372117 | A1 | 12/2017 | Bredno et al. |
| 2020/0342597 | A1* | 10/2020 | Chukka ............... G06V 20/698 |

FOREIGN PATENT DOCUMENTS

| | | |
|---|---|---|
| WO | 2014140085 A1 | 9/2014 |
| WO | 2014195193 A1 | 12/2014 |
| WO | 2015124772 A1 | 8/2015 |
| WO | 2016075095 A2 | 5/2016 |
| WO | 2016120442 A1 | 8/2016 |
| WO | 2017093524 A1 | 6/2017 |
| WO | 2017198790 A1 | 11/2017 |

OTHER PUBLICATIONS

"Bwboundaries", MathWorks, Help Center, Available Online at: https://www.mathworks.com/help/images/ref/bwboundaries.html, Accessed from Internet on Aug. 2, 2022, 8 pages.

U.S. Appl. No. 16/949,030, "Notice of Allowance", Aug. 2, 2023, 25 pages.

Ausubel et al., "Current Protocols in Molecular Biology", John Wiley & Sons, Inc., Dec. 4, 2003, 388 pages.

Cuevas et al., "An Improved Computer Vision Method for White Blood Cells Detection", Computational And Mathematical Methods in Medicine, vol. 2013, Jan. 1, 2013, pp. 1-14.

EP Application No. 19721200.4, "Office Action", mailed on Dec. 9, 2022, 4 pages.

Fatakdawala , "Expectation-Maximization-Driven Geodesic Active Contour with Overlap Resolution (EMaGACOR): Application to Lymphocyte Segmentation on Breast Cancer Histopathology", IEEE Transactions on Biomedical Engineering, vol. 57, No. 7, Jul. 2010, pp. 1676-1689.

Gautam et al., "Classification of White Blood Cells Based on Morphological Features", International Conference on Advances in Computing, Communications and Informatics (Icacci), IEEE, Sep. 24, 2014, 6 pages.

Gonzalez et al., "Digital Image Processing", Third Edition, Chapter 10, Image Segmentation, 2008, 5 pages.

Kim et al., "Tumor-Infiltrating Lymphocytes, Tumor Characteristics, and Recurrence in Patients with Early Breast Cancer", American Journal of Clinical Oncology, vol. 36, No. 3, Jun. 2013, pp. 224-231.

Kmiecik et al., "Elevated CD3+ and CD8+ Tumor-Infiltrating Immune Cells Correlate with Prolonged Survival in Glioblastoma Patients Despite Integrated Immunosuppressive Mechanisms in the Tumor Microenvironment and at the Systemic Level", Journal of Neuroimmunology, vol. 264, No. 1-2, Nov. 15, 2013, pp. 71-83.

Kong et al., "A Comprehensive Framework for Classification of Nuclei in Digital Microscopy Imaging: An Application to Diffuse Gliomas", Proceedings in Institute of Electrical and Electronics Engineers International Symposium Biomedical Imaging, Mar. 30, 2011, pp. 2128-2131.

Lawson et al., "Solving Least squares Problems", Prentice Hall, Chapter 23, 1974, 6 pages.

Parvin et al., "Iterative Voting for Inference of Structural Saliency and Characterization of Subcellular Events", Institute of Electrical and Electronics Engineers, Transactions on Image Processing, vol. 16, No. 3, Mar. 2007, pp. 615-623.

Patraucean et al., "A Parameterless Line Segment and Elliptical Arc Detector with Enhanced Ellipse Fitting", Available Online at: http://ubee.enseeiht.fr/vision/ELSD/eccv2012-ID576.pdf, 2012, pp. 572-585.

PCT/EP2019/059181, "International Search Report and Written Opinion", Jul. 17, 2019, 14 pages.

Piersma et al., "High Number of Intraepithelial CD8+ Tumor-Infiltrating Lymphocytes is Associated with the Absence of Lymph Node Metastases in Patients with Large Early-Stage Cervical Cancer", Cancer Research, vol. 67, No. 1, Jan. 1, 2007, pp. 354-361.

Sambrook et al., "Molecular Cloning: A Laboratory Manual", Second Edition, Cold Spring Harbor Laboratory Press, 1989, 30 pages.

Xing et al., "Robust Nucleus/Cell Detection and Segmentation in Digital Pathology and Microscopy Images: A Comprehensive Review", Institute of Electrical and Electronics Engineers Reviews in Biomedical Engineering, vol. 9, 2016, pp. 234-263.

Yuen et al., "Ellipse Detection Using the Hough Transform", Available Online at: http://www.bmva.org/bmvc/1988/avc-88-041.pdf, Jan. 1988, pp. 265-272.

Zimmermann, "Spectral Imaging and Linear Unmixing in Light Microscopy", Advances in Biochemical Engineering/Biotechnology, vol. 95, 2005, pp. 245-265.

* cited by examiner

SYSTEMS FOR CELL SHAPE ESTIMATION

CROSS REFERENCE TO RELATED APPLICATIONS

The present application is a continuation application of U.S. application Ser. No. 16/949,030, entitled "SYSTEMS FOR CELL SHAPE ESTIMATION," filed on Oct. 9, 2020, which is a continuation of International Application PCT/EP2019/059181, entitled "SYSTEMS FOR CELL SHAPE ESTIMATION," filed on Apr. 11, 2019, which claims priority to U.S. Provisional Patent Application No. 62/657,509, filed on Apr. 13, 2018. Each of these applications are hereby incorporated by reference herein in their entireties and for all purposes.

BACKGROUND

Digital pathology involves scanning of whole histopathology or cytopathology glass slides into digital images interpretable on a computer screen. These images are later processed by an imaging algorithm or interpreted by a pathologist. To examine tissue sections (which are virtually transparent), tissue sections are prepared using colored histochemical stains that bind selectively to cellular components. Color-enhanced, or stained, cellular structures are used by clinicians or a computer-aided diagnosis (CAD) algorithm to identify morphological markers of a disease, and to proceed with therapy accordingly. Observing the assay enables a variety of processes, including diagnosis of disease, assessment of response to treatment, and development of new drugs to fight disease.

Immunohistochemical (IHC) slide staining can be utilized to identify one or more proteins in cells of a tissue section and hence is widely used in the study of different types of cells, such as cancerous cells and immune cells in biological tissue. Thus, IHC staining may be used in research to understand the distribution and localization of the differentially expressed biomarkers of immune cells (such as T-cells or B-cells) in a cancerous tissue for an immune response study. For example, tumors often include infiltrates of immune cells, which may prevent the development of tumors or favor the outgrowth of tumors.

Lymphocytes (T cells), especially CD8 cytotoxic T cells, are key part of the anti-tumor immunity. To mount an effective immune response, T cells must achieve several distinct steps. First, T lymphocytes need to be fully activated by mature dendritic cells in the tumor-draining lymph node. Second, cancer-specific effector T cells must enter the tumor after leaving the blood vessels. Finally, tumor-infiltrating lymphocytes (TIL) need to perform their function which ultimately leads to tumor regression. However, it is clearly recognized that tumors may escape T cell attack by variety of mechanisms. One of them could be the location of T cells within a tumor. Thus, in most human solid tumors, T cells are rarely in contact with cancer cells but greatly enriched in the stroma, a surrounding microenvironment composed of non-cancer cells along with the extracellular matrix (ECM). An absence of T cell infiltration into tumor islets might constitute a major obstacle for T cell-mediated anti-tumor activities.

The trafficking of T cells is a key process to allow and regulate their immune-surveillance duties. Indeed, the high motility capabilities of immune cells are coupled to their ability to detect and eliminate pathogens and tumors. Trafficking of cells to the site of disease is a critical step for a successful immune response against pathogens and cancer.

In the cancer setting, the presence of tumor-infiltrating lymphocytes (TIL) has been reported to correlate well with positive clinical outcomes. On the other hand, and in some tumor subtypes (e.g. luminal breast cancer), TILs are associated with poor prognosis.

Chemokines can attract T cells to the tumor site and tumor intrinsic pathways can influence the composition of local chemokines. On the other hand, tumor-induced vasculature can hamper T cell migration. Moreover, other immune cells and tumor-derived molecules can block T cell proliferation and survival.

BRIEF SUMMARY

Immunotherapy with tumor infiltrating lymphocytes or other agents (e.g. checkpoint inhibitors) are promising approaches being widely investigated for the treatment of cancers. Detecting lymphocytes in stained histological tissue images is a critical step in the clinical studies. The quantification of lymphocytes provides one solution to quantify the immune response so that researchers can analyze the treatment outcome of immunotherapy quantitatively. In addition to understanding the density and spatial arrangement of lymphocytes with respect to a tumor or to individual tumor cells, Applicant submits that understanding the motility of lymphocytes allows for a superior understanding of whether a candidate patient will respond well to therapy.

The present disclosure relates, among other things, to automated systems and methods for analyzing images of a biological sample stained with one or more stains, identifying lymphocytes within the stained biological sample, and deriving one or more shape metrics for each identified lymphocyte. In some embodiments, the one or more derived shape metrics serve as a surrogate for lymphocyte motility, with those lymphocytes having a circular or nearly circular shape being indicative of lymphocytes that are likely not motile, while those lymphocytes having an elongate shape being indicate of lymphocytes that are more likely to be motile.

In one aspect of the present disclosure is a method of processing image analysis data derived from an image of a biological specimen stained for the presence of at least one lymphocyte biomarker the method comprising: (a) detecting lymphocytes in the image; (b) computing a foreground segmentation mask based on the detected lymphocytes within the image; (c) identifying outlines of the detected lymphocytes in the image by filtering the image with the computed foreground segmentation mask; (d) deriving a shape metric based on an outline of each of the segmented lymphocytes; and (e) associating at least the derived shape metric for each detected lymphocyte with coordinates for each detected lymphocyte. In some embodiments, the method further comprises retrieving stored coordinates and associated shape metric data from a database and projecting the retrieved data onto the image. In some embodiments, the method further comprises unmixing the image (e.g., a multiplex image) of the biological specimen into individual image channel images, each image channel image representing signals corresponding to a single stain (e.g. a first lymphocyte biomarker stain channel, a second lymphocyte biomarker stain channel, a hematoxylin channel, etc.).

In some embodiments, the shape metric is a minor axis/major axis aspect ratio, an eccentricity parameter, a circularity parameter, a roundness parameter, or a solidity parameter. In some embodiments, the minor axis/major axis aspect ratio is derived by: (i) fitting an ellipse to the outline of each of the segmented lymphocytes; (ii) calculating a length of the fitted ellipse's minor axis and major axis; and (iii) calculating an aspect ratio between the calculated lengths of the minor and major axes. In some embodiments, the ellipse is fitted to the outline of each of the segmented lymphocytes by performing a Hough transform or a Randomized Hough Transform.

In some embodiments, the roundness parameter is derived by: (i) fitting an ellipse to the outline of each of the segmented lymphocytes; (ii) calculating a length of the fitted ellipse's major axis; (iii) deriving an area of the outline of each of the segmented lymphocytes; and (iv) calculating 4*{[the derived area]/Pi*[the calculated length of the ellipse's major axis]$^2$}.

In some embodiments, the biological sample is stained for the presence of CD8 cytotoxic T cells (e.g. stained for the presence of CD8), regulatory T cells (e.g. stained for the presence of FOXP3), and/or for helper T cells (e.g. stained for the presence of CD4). In some embodiments, multiple biomarkers are introduced such that a combination of certain biomarkers leads to double staining of cells and thus a sub-classification. For example, a tissue section could be stained for CD8 and Ki67 (proliferation marker). This would then allow for classification of CD8 positive T cells into proliferating and non-proliferating as well as sub-classifying the cells further into, for example, proliferating and mobile (i.e. elongated) T cells.

In some embodiments, the method further comprises classifying each of the detected lymphocytes, such as within a predefined area (e.g. a region of a tissue sample, an entire tissue area, a whole slide). In some embodiments, detected lymphocytes are classified as cytotoxic T-lymphocytes, regulatory T-cells, or T-helper cells. In some embodiments, the method further comprises detecting a cell density for each type of classified lymphocyte. In some embodiments, the method further comprises quantitatively determining the number of cells positive for at least one marker selected from the group consisting of CD8, CD4, FOXP3, CD45RA, and CD45RO.

In some embodiments, the method further comprises comparing a value of the derived shape metric to a predetermined threshold value for the particular derived shape metric and assigning a predictive cell motility label to the detected lymphocyte based on the comparison. In some embodiments, the value of the derived shape metric is compared to a series of ranges of predetermined threshold values and wherein each detected lymphocyte is assigned one of a plurality of cell motility labels based on the comparison.

In some embodiments, the method further comprises generating a representational object for each detected lymphocyte and overlaying the representational objects onto the detected lymphocytes in the image. In some embodiments, the representational objects are a seed points, and wherein each seed point is assigned a color corresponding to one of a plurality of assigned cell motility labels. In some embodiments, the representational objects are filled outlines of each segmented lymphocyte, and wherein each filled outline is assigned a color corresponding to one of a plurality of assigned cell motility labels.

In some embodiments, the method further comprises detecting and classifying tumor cells within the image. In some embodiments, the biological sample is stained for the presence of a PD-L1 biomarker and wherein an expression score is derived based on the number of tumor cells and lymphocytes expressing the PD-L1 biomarker. In some embodiments, the method further comprises classifying the detected lymphocytes as tumor-infiltrating lymphocytes. In some embodiments, Pan cytokeratin is utilized for the identification of epithelial tumor cells (e.g. PD-L1 can be expressed both in tumor and immune cells in general (not only lymphocytes)).

In another aspect of the present disclosure is a system for processing image analysis data derived from an image of a biological specimen stained for the presence of at least one lymphocyte biomarker, the system comprising: (i) one or more processors, and (ii) a memory coupled to the one or more processors, the memory to store computer-executable instructions that, when executed by the one or more processors, cause the system to perform operations comprising: detecting lymphocytes in the image of the stained biological sample; identifying outlines of the detected lymphocytes by segmenting the detected lymphocytes from other cells within the image; deriving a shape metric based on the identified outlines of each of the detected lymphocytes; and associating at least the derived metrics for each detected lymphocyte with lymphocyte location information. In some embodiments, the associated metrics and information may be stored in a database.

In some embodiments, the shape metric is a minor axis/major axis aspect ratio, an eccentricity parameter, a circularity parameter, a roundness parameter, or a solidity parameter. In some embodiments, the minor axis/major axis aspect ratio is derived by: (i) fitting an ellipse to the outline of each of the segmented lymphocytes; (ii) calculating a length of the fitted ellipse's minor axis and major axis; and (iii) calculating an aspect ratio between the calculated lengths of the minor and major axes. In some embodiments, the ellipse is fitted to the outline of each of the segmented lymphocytes by performing a Hough transform or a Randomized Hough Transform.

In some embodiments, the system further comprises instructions for classifying each of the detected lymphocytes within a predefined area of the image. In some embodiments, the detected lymphocytes are classified as cytotoxic T-lymphocytes, regulatory T-cells, or T-helper cells.

In some embodiments, the system further comprises instructions for comparing a value of the derived shape metric to a predetermined threshold value for the particular derived shape metric and assigning a predictive cell motility label to the detected lymphocyte based on the comparison. In some embodiments, the value of the derived shape metric is compared to a series of ranges of predetermined threshold values and wherein each detected lymphocyte is assigned one of a plurality of cell motility labels based on the comparison.

In some embodiments, the system further comprises instructions for generating a representational object for each detected lymphocyte and overlaying the representational objects onto the detected lymphocytes in the image. In some embodiments, the representational objects are a seed points, and wherein each seed point is assigned a color corresponding to one of the assigned plurality of cell motility labels.

In another aspect of the present disclosure is a non-transitory computer-readable medium storing instructions for estimating shapes of lymphocytes in a biological sample stained for at least the presence of the lymphocytes comprising: detecting lymphocytes in the image of the stained biological sample; identifying outlines of the detected lymphocytes by segmenting the detected lymphocytes from other cells within the image; and deriving a shape metric based on the identified outlines of each of the detected lymphocytes. In some embodiments, non-transitory computer-readable medium further comprises instructions for storing the derived shape metrics for each of the detected lymphocytes along with an x,y coordinate position of the detected lymphocyte from the image.

The non-transitory computer-readable medium, wherein the shape metric is a minor axis/major axis aspect ratio, an eccentricity parameter, a circularity parameter, a roundness parameter, or a solidity parameter. In some embodiments, the minor axis/major axis aspect ratio is derived by: (i) fitting an ellipse to the outline of each of the segmented lymphocytes; (ii) calculating a length of the fitted ellipse's minor axis and major axis; and (iii) calculating an aspect ratio between the calculated lengths of the minor and major axes. In some embodiments, the ellipse is fitted to the outline of each of the segmented lymphocytes by performing a Hough transform or a Randomized Hough Transform.

In some embodiments, non-transitory computer-readable medium further comprises instructions for comparing a value of the derived shape metric to a predetermined threshold value for the particular derived shape metric and assigning a predictive cell motility label to the detected lymphocyte based on the comparison. In some embodiments, the value of the derived shape metric is compared to a series of ranges of predetermined threshold values and wherein each detected lymphocyte is assigned one of a plurality of cell motility labels based on the comparison.

In some embodiments, non-transitory computer-readable medium further comprises instructions for generating a representational object for each detected lymphocyte and overlaying the representational objects onto the detected lymphocytes in the image. In some embodiments, the representational objects are a seed points, and wherein each seed point is assigned a color corresponding to one of the assigned plurality of cell motility labels.

Applicants submit that the present disclosure enables detecting lymphocytes, estimating their relative shape, and associating the relative shape information with location information in a more accurate and/or more efficient manner than could be performed by a pathologist. Applicants further believe that the systems and methods described herein enable the collection and analysis of data at high speeds, such that data may be processed from a whole slide image, not just a portion thereof. Thus, the presently disclosed systems are not only novel, but facilitate the efficient, high speed processing of data from biological samples.

BRIEF DESCRIPTION OF THE FIGURES

The patent or application file contains at least one drawing executed in color. Copies of this patent or patent application publication with color drawings will be provided to the Office upon request and the payment of the necessary fee. For a general understanding of the features of the disclosure, reference is made to the drawings. In the drawings, like reference numerals have been used throughout to identify identical elements.

DETAILED DESCRIPTION

Figure 1:
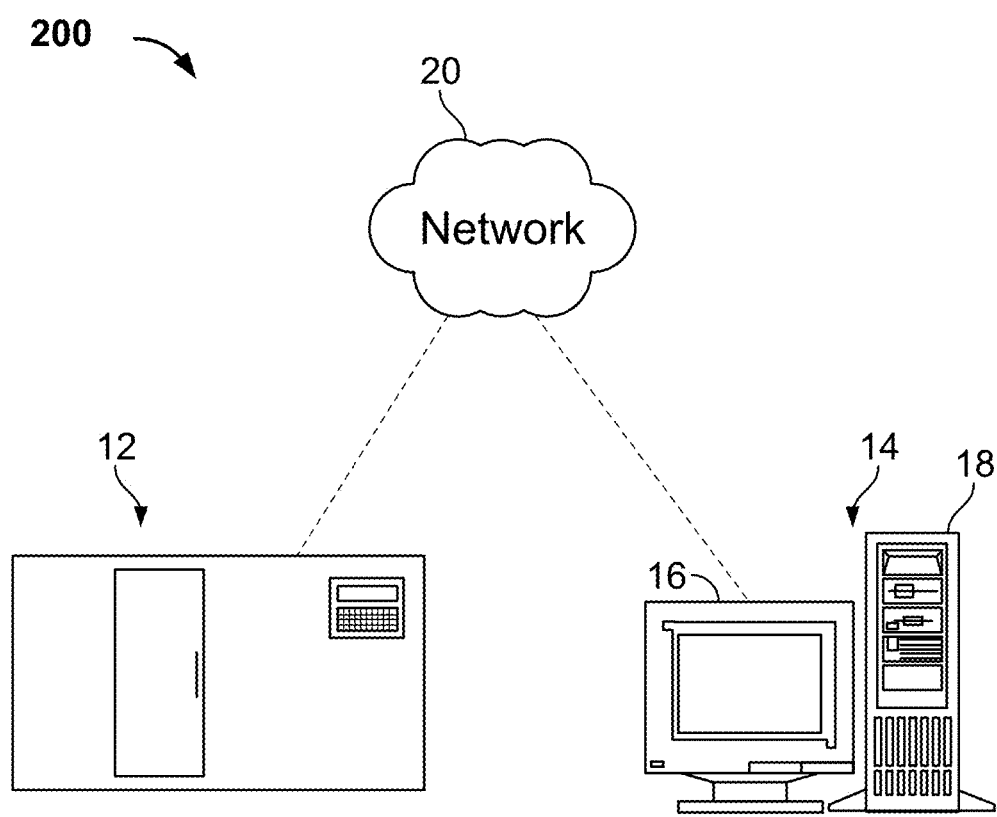
FIG. 1 illustrates a representative digital pathology system including an image acquisition device and a computer system, in accordance with some embodiments.

It should also be understood that, unless clearly indicated to the contrary, in any methods claimed herein that include more than one step or act, the order of the steps or acts of the method is not necessarily limited to the order in which the steps or acts of the method are recited.

As used herein, the singular terms "a," "an," and "the" include plural referents unless context clearly indicates otherwise. Similarly, the word "or" is intended to include "and" unless the context clearly indicates otherwise. The term "includes" is defined inclusively, such that "includes A or B" means including A, B, or A and B.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the claims, shall have its ordinary meaning as used in the field of patent law.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "biological sample" or "tissue sample" refers to any sample including a biomolecule (such as a protein, a peptide, a nucleic acid, a lipid, a carbohydrate, or a combination thereof) that is obtained from any organism including viruses. Other examples of organisms include mammals (such as humans; veterinary animals like cats, dogs, horses, cattle, and swine; and laboratory animals like mice, rats and primates), insects, annelids, arachnids, marsupials, reptiles, amphibians, bacteria, and fungi. Biological samples include tissue samples (such as tissue sections and needle biopsies of tissue), cell samples (such as cytological smears such as Pap smears or blood smears or samples of cells obtained by microdissection), or cell fractions, fragments or organelles (such as obtained by lysing cells and separating their components by centrifugation or otherwise). Other examples of biological samples include blood, serum, urine, semen, fecal matter, cerebrospinal fluid, interstitial fluid, mucous, tears, sweat, pus, biopsied tissue (for example, obtained by a surgical biopsy or a needle biopsy), nipple aspirates, cerumen, milk, vaginal fluid, saliva, swabs (such as buccal swabs), or any material containing biomolecules that is derived from a first biological sample. In certain embodiments, the term "biological sample" as used herein refers to a sample (such as a homogenized or liquefied sample) prepared from a tumor or a portion thereof obtained from a subject.

As used herein, the terms "biomarker" or "marker" refer to a measurable indicator of some biological state or condition. In particular, a biomarker may be a protein or peptide, e.g. a surface protein, that can be specifically stained, and which is indicative of a biological feature of the cell, e.g. the cell type or the physiological state of the cell. An immune cell marker is a biomarker that is selectively indicative of a feature that relates to an immune response of a mammal. A biomarker may be used to determine how well the body responds to a treatment for a disease or condition or if the subject is predisposed to a disease or condition. In the context of cancer, a biomarker refers to a biological substance that is indicative of the presence of cancer in the body. A biomarker may be a molecule secreted by a tumor or a specific response of the body to the presence of cancer. Genetic, epigenetic, proteomic, glycomic, and imaging biomarkers can be used for cancer diagnosis, prognosis, and epidemiology. Such biomarkers can be assayed in non-invasively collected biofluids like blood or serum. Several gene and protein based biomarkers have already been used in patient care including but, not limited to, AFP (Liver Cancer), BCR-ABL (Chronic Myeloid Leukemia), BRCA1/BRCA2 (Breast/Ovarian Cancer), BRAF V600E (Melanoma/Colorectal Cancer), CA-125 (Ovarian Cancer), CA19.9 (Pancreatic Cancer), CEA (Colorectal Cancer), EGFR (Non-small-cell lung carcinoma), HER-2 (Breast Cancer), KIT(Gastrointestinal stromal tumor), PSA (Prostate Specific Antigen), S100 (Melanoma), and many others. Biomarkers may be useful as diagnostics (to identify early stage cancers) and/or prognostics (to forecast how aggressive a cancer is and/or predict how a subject will respond to a particular treatment and/or how likely a cancer is to recur).

A "foreground segmentation mask" is, for example, an image mask created by a segmentation algorithm that allows separating one or more pixel blobs (to be used as "foreground pixels") from other pixels (constituting the "background"). For example, the foreground segmentation mask may be generated by a nuclear segmentation algorithm and the application of the foreground segmentation mask on an image depicting a tissue section may allow identification of nuclear blobs in an image.

As used herein, the term "image data" as understood herein encompasses raw image data acquired from the biological sample, such as by means of an optical sensor or sensor array, or pre-processed image data. In particular, the image data may comprise a pixel matrix.

As used herein, the term "immunohistochemistry" refers to a method of determining the presence or distribution of an antigen in a sample by detecting interaction of the antigen with a specific binding agent, such as an antibody. A sample is contacted with an antibody under conditions permitting antibody-antigen binding. Antibody-antigen binding can be detected by means of a detectable label conjugated to the antibody (direct detection) or by means of a detectable label conjugated to a secondary antibody, which binds specifically to the primary antibody (indirect detection).

A "mask" as used herein is a derivative of a digital image wherein each pixel in the mask is represented as a binary value, e.g. "1" or "0" (or "true" or "false"). By overlaying a digital image with said mask, all pixels of the digital image mapped to a mask pixel of a particular one of the binary values are hidden, removed, or otherwise ignored or filtered out in further processing steps applied on the digital image. For example, a mask can be generated from an original digital image by assigning all pixels of the original image with an intensity value above a threshold to true and otherwise false, thereby creating a mask that will filter out all pixels overlaid by a "false" masked pixel.

A "multi-channel image" as understood herein encompasses a digital image obtained from a biological tissue sample in which different biological structures, such as nuclei and tissue structures, are simultaneously stained with specific fluorescent dyes, quantum dots, chromogens, etc., each of which fluoresces or are otherwise detectable in a different spectral band thus constituting one of the channels of the multi-channel image.

Overview

Applicant has developed a system and method for analyzing images of stained biological specimens, including deriving shape metrics for lymphocytes identified within the images of the stained biological samples. The derived shape metrics may be stored along with other relevant data, e.g. the coordinates of the identified lymphocytes, an area measurement of each lymphocyte, a staining intensity of a lymphocyte biomarker, etc. In some embodiments, the shape metrics derived from the images may be projected onto the images, in the form of representational objects correlating a value of the derived shape metric to a likelihood that a particular lymphocyte is motile (e.g. a range of colors with each color representing a different likelihood that the lymphocyte is dynamic or motile). Applicants believe that the systems and methods of the present disclosure allow for predicting whether identified lymphocytes are motile. In some embodiments, the identification of motile lymphocytes allows for an indication of those lymphocytes that are capable of attacking tumor cells. Alternatively, the identification of non-motile lymphocytes allows for an indication of whether the identified lymphocytes are interacting with the tumor cells.

The tumor stroma consists of a variety of cell types that include endothelial cells, fibroblasts, pericytes, and immune subtypes such as lymphocytes, granulocytes, and macrophages. The profile of the tumor infiltrating lymphocytes (TILs) present within the tumor microenvironment reflects the diversity in tumor biology and host-tumor interactions. In various solid cancer settings, the frequency and type of TILs have been reported to correlate with outcomes in some patients, although this may vary according to tumor type. Nevertheless, improved antitumor responses have been shown to positively correlate with increased cytotoxic T lymphocyte (CTL) infiltration in various cancers, including colorectal, breast, cervical cancers, and glioblastoma. See Kim et al., "Tumor infiltrating lymphocytes, tumor characteristics, and recurrence in patients with early breast cancer," Am J Clin Oncol 2013; 36:224-31; Piersma et al., "High number of intraepithelial CD8+ tumor-infiltrating lymphocytes is associated with the absence of lymph node metastases in patients with large early-stage cervical cancer," Cancer Res 2007; 67:354-61; and Kmiecik et al., "Elevated CD3+ and CD8+ tumor-infiltrating immune cells correlate with prolonged survival in glioblastoma patients despite integrated immunosuppressive mechanisms in the tumor microenvironment and at the systemic level, "J Neuroimmunol 2013; 264:71-83," the disclosures of which are hereby incorporated by reference herein in their entireties.

It is believed that naturally primed CTLs have the capacity to identify and eradicate malignant cells through recognition of tumor-associated antigens presented by MHCI. However, only a small number of CTLs are generally able to infiltrate the tumor site, which contrasts with the T cell infiltration process in inflammatory or infectious disease setting. CTL trafficking (i.e. their migration) is a tightly controlled process, and factors such as mismatching of chemokine-chemokine receptor pairs, downregulation of adhesion molecules, and aberrant vasculature may all contribute to the poor homing of these cells. An identification of those motile lymphocytes is believed to be a prognostic indicator as well as for predicting whether a patient would benefit from treatment with a particular immunotherapy or for predicting a patient's prognosis.

Figure 5:
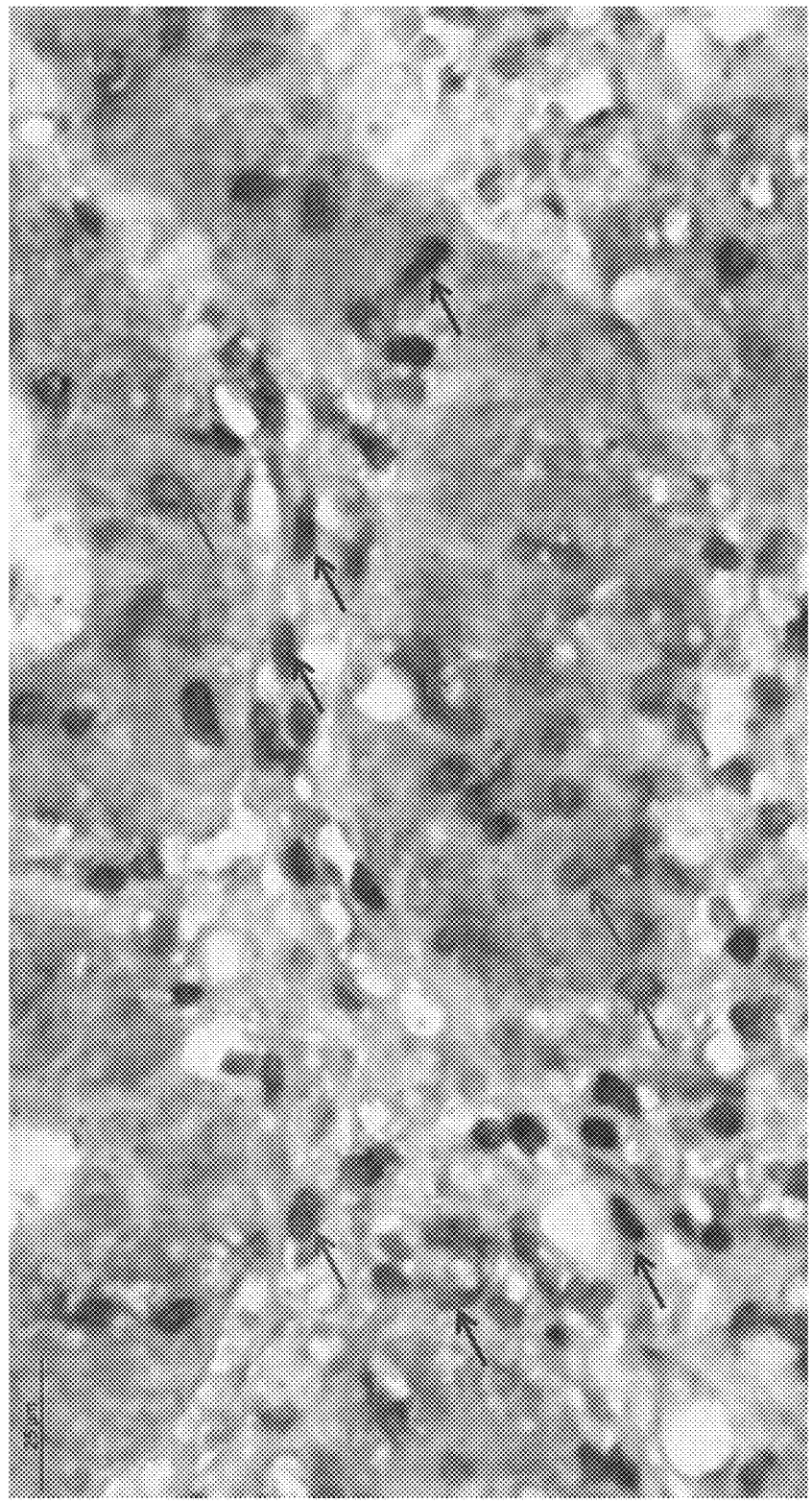
FIG. 5 illustrates a region of a tissue sample of colorectal cancer, stained with CD3/red and Perforin/DAB (brightfield). T-cells stain with a red membrane. This tissue region contains symmetric, round stained cells (single arrows) and elongated cells (double arrows).
Figure 6:
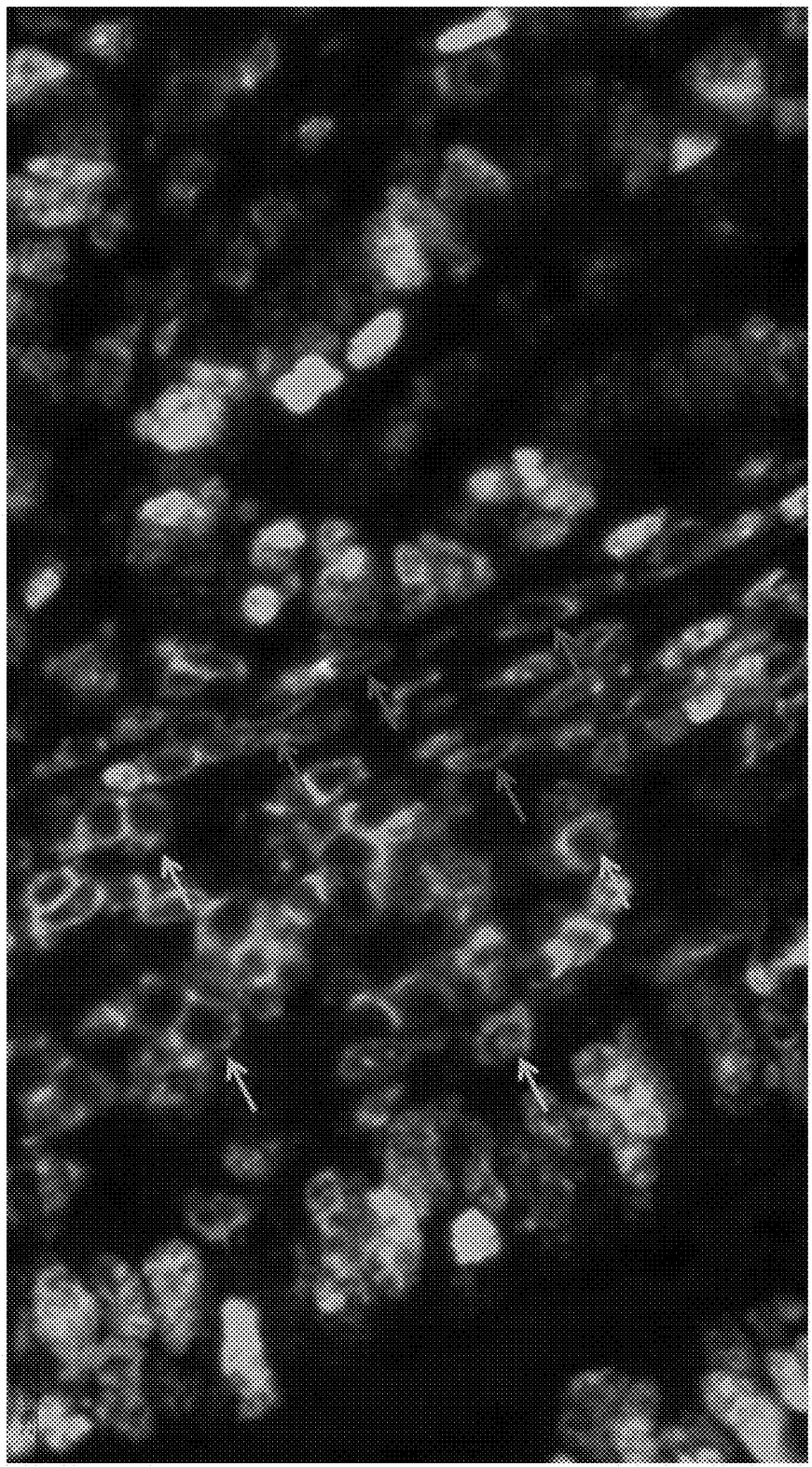
FIG. 6 illustrates a region of a tissue sample stained with CD3/cyan, CD4/green. CD8/red, and non-T-cell markers in yellow and blue (fluorescence). T-cells stain red, cyan, or green membranes This tissue region contains symmetric, round stained cells (single arrows) and elongated cells (double arrows).

The systems and methods described herein facilitate the recognition of whether lymphocytes in a particular biological sample are more likely to be motile from those that are not, thus providing prognostic information which may be used to make informed clinical decisions. It is believed that lymphocytes that are motile may have a shape that is more elongate and less round than a comparatively less motile lymphocyte. For example, FIG. 5 illustrates colorectal cancer cells chromogenically stained for the identification of cytotoxic T cells. FIG. 5 particularly illustrates that within the population of identified cytotoxic T cells, some are more circular than others, i.e. some are circular in appearance while others are more elongate in shape (e.g. having a substantially ovoid shape or having a substantially elliptical shape). FIG. 6 similarly illustrates a region of a tissue sample having various stains (fluorogenic stains) indicating the presence of cytotoxic T cells and helper T cells, where some of the T cells again have a round or symmetrical appearance, while others are more elongate (e.g. more elliptical in shape as opposed to circular in shape). As noted herein, those T cells that are motile have a less round (i.e. less circular) appearance—they may be visually recognized as elliptical or substantially elliptical. As such, the shape of a lymphocyte may serve as a surrogate for lymphocyte motility, as evidenced by FIGS. 5 and 6.

At least some embodiments of the present disclosure relate to computer systems and methods for analyzing digital images captured from biological samples, including tissue samples, stained with one or more primary stains (e.g. hematoxylin and eosin (H&E)) and one or more detection probes (e.g. probes containing a specific binding entity which facilitates the labeling of targets within the sample). While examples herein may refer to specific tissues and/or the application of specific stains or detection probes for the detection of certain markers (and hence diseases), the skilled artisan will appreciate that different tissues and different stains/detection probes may be applied to detect different markers and different diseases.

A digital pathology system 200 for imaging and analyzing specimens, in accordance with some embodiments, is illustrated in FIG. 1. The digital pathology system 200 may comprise an imaging apparatus 12 (e.g. an apparatus having means for scanning a specimen-bearing microscope slide) and a computer 14, whereby the imaging apparatus 12 and computer may be communicatively coupled together (e.g. directly, or indirectly over a network 20). The computer system 14 can include a desktop computer, a laptop computer, a tablet, or the like, digital electronic circuitry, firmware, hardware, memory, a computer storage medium, a computer program or set of instructions (e.g. where the program is stored within the memory or storage medium), one or more processors (including a programmed processor), and any other hardware, software, or firmware modules or combinations thereof. For example, the computing system 14 illustrated in FIG. 1 may comprise a computer with a display device 16 and an enclosure 18. The computer can store digital images in binary form (locally, such as in a memory, on a server, or another network connected device). The digital images can also be divided into a matrix of pixels. The pixels can include a digital value of one or more bits, defined by the bit depth. The skilled artisan will appreciate that other computer devices or systems may be utilized and that the computer systems described herein may be communicatively coupled to additional components, e.g. specimen analyzers, microscopes, other imaging systems, automated slide preparation equipment, etc. Some of these additional components and the various computers, networks, etc. that may be utilized are described further herein.

In general, the imaging apparatus 12 (or other image source including pre-scanned images stored in a memory) can include, without limitation, one or more image capture devices. Image capture devices can include, without limitation, a camera (e.g., an analog camera, a digital camera, etc.), optics (e.g., one or more lenses, sensor focus lens groups, microscope objectives, etc.), imaging sensors (e.g., a charge-coupled device (CCD), a complimentary metal-oxide semiconductor (CMOS) image sensor, or the like), photographic film, or the like. In digital embodiments, the image capture device can include a plurality of lenses that cooperate to prove on-the-fly focusing. An image sensor, for example, a CCD sensor can capture a digital image of the specimen. In some embodiments, the imaging apparatus 12 is a brightfield imaging system, a multispectral imaging (MSI) system or a fluorescent microscopy system. The digitized tissue data may be generated, for example, by an image scanning system, such as a VENTANA iScan HT scanner by VENTANA MEDICAL SYSTEMS, Inc. (Tucson, Arizona) or other suitable imaging equipment. Additional imaging devices and systems are described further herein. The skilled artisan will appreciate that the digital color image acquired by the imaging apparatus 12 can be conventionally composed of elementary color pixels. Each colored pixel can be coded over three digital components, each comprising the same number of bits, each component corresponding to a primary color, generally red, green or blue, also denoted by the term "RGB" components.

Figure 2:
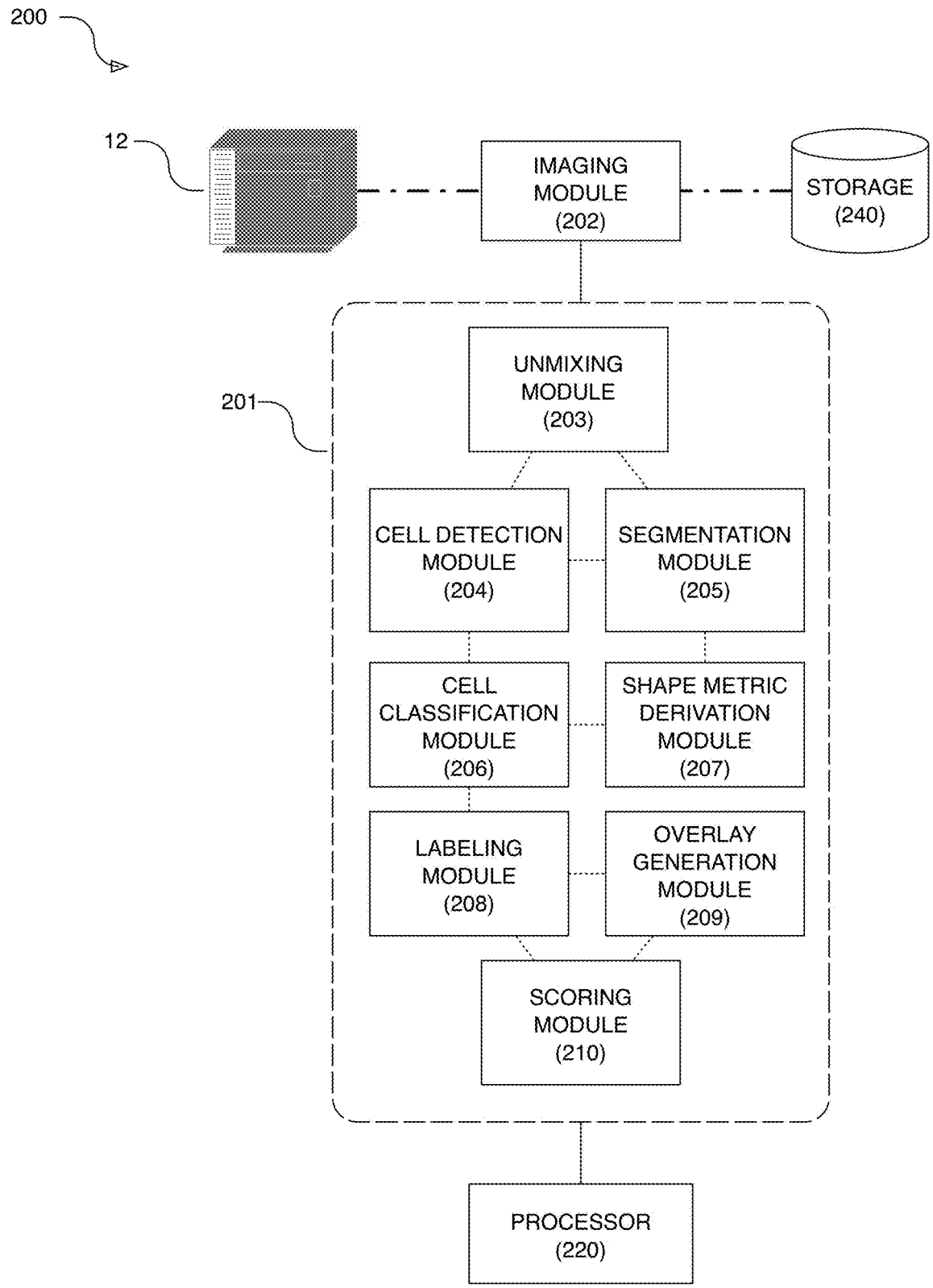
FIG. 2 sets forth various modules that can be utilized in a digital pathology system or within a digital pathology workflow, in accordance with some embodiments.

FIG. 2 provides an overview of the various modules utilized within the presently disclosed digital pathology system. In some embodiments, the digital pathology system 200 employs a computer device or computer-implemented method having one or more processors 220 and at least one memory 201, the at least one memory 201 storing non-transitory computer-readable instructions for execution by the one or more processors to cause the one or more processors (220) to execute instructions (or stored data) in one or more modules (e.g. modules 202 through 210).

Figure 3A:
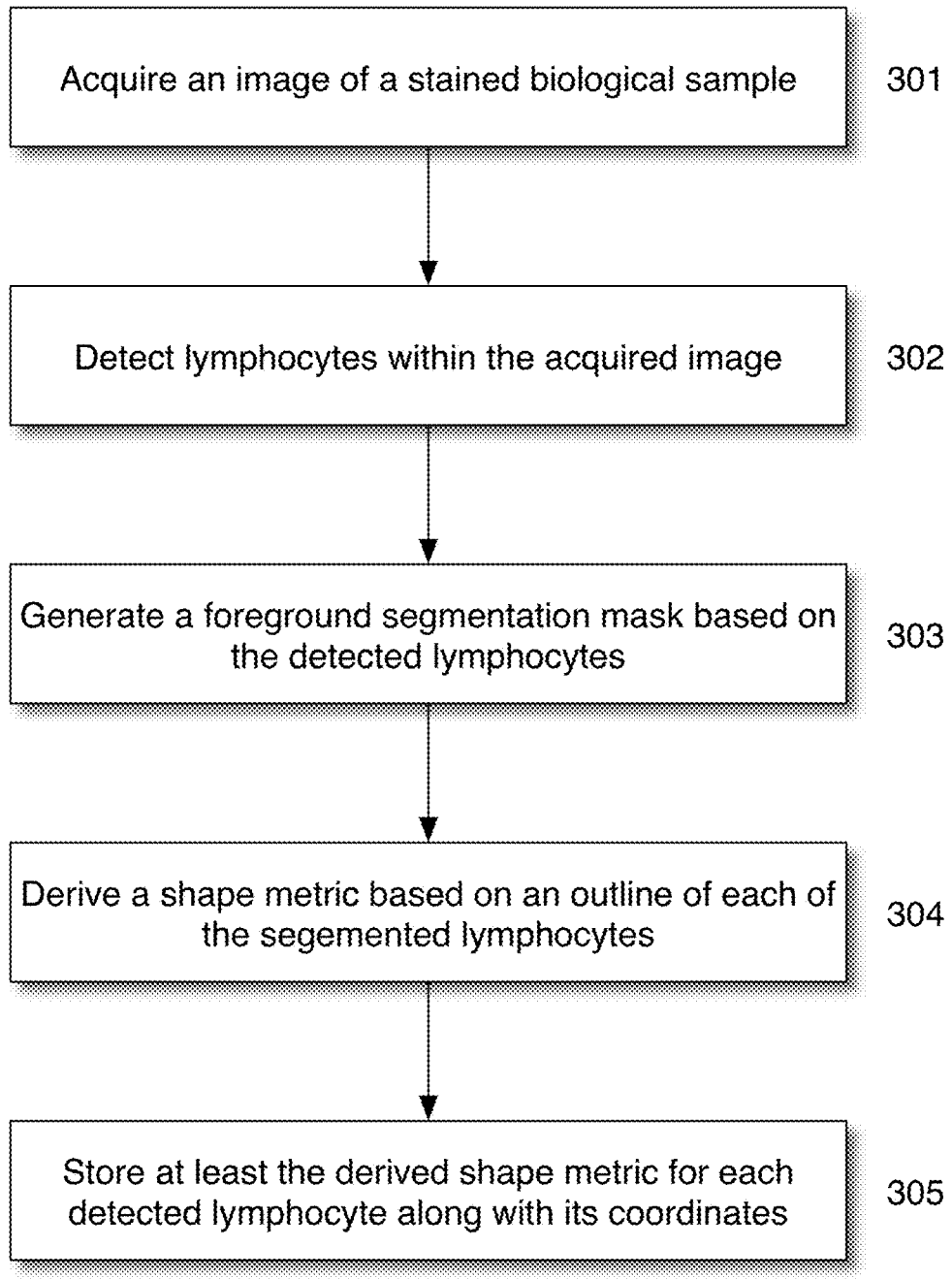
FIG. 3A sets forth a flowchart illustrating the various steps of detecting lymphocytes and deriving a shape metric for each detected lymphocyte, in accordance with some embodiments.
Figure 3B:
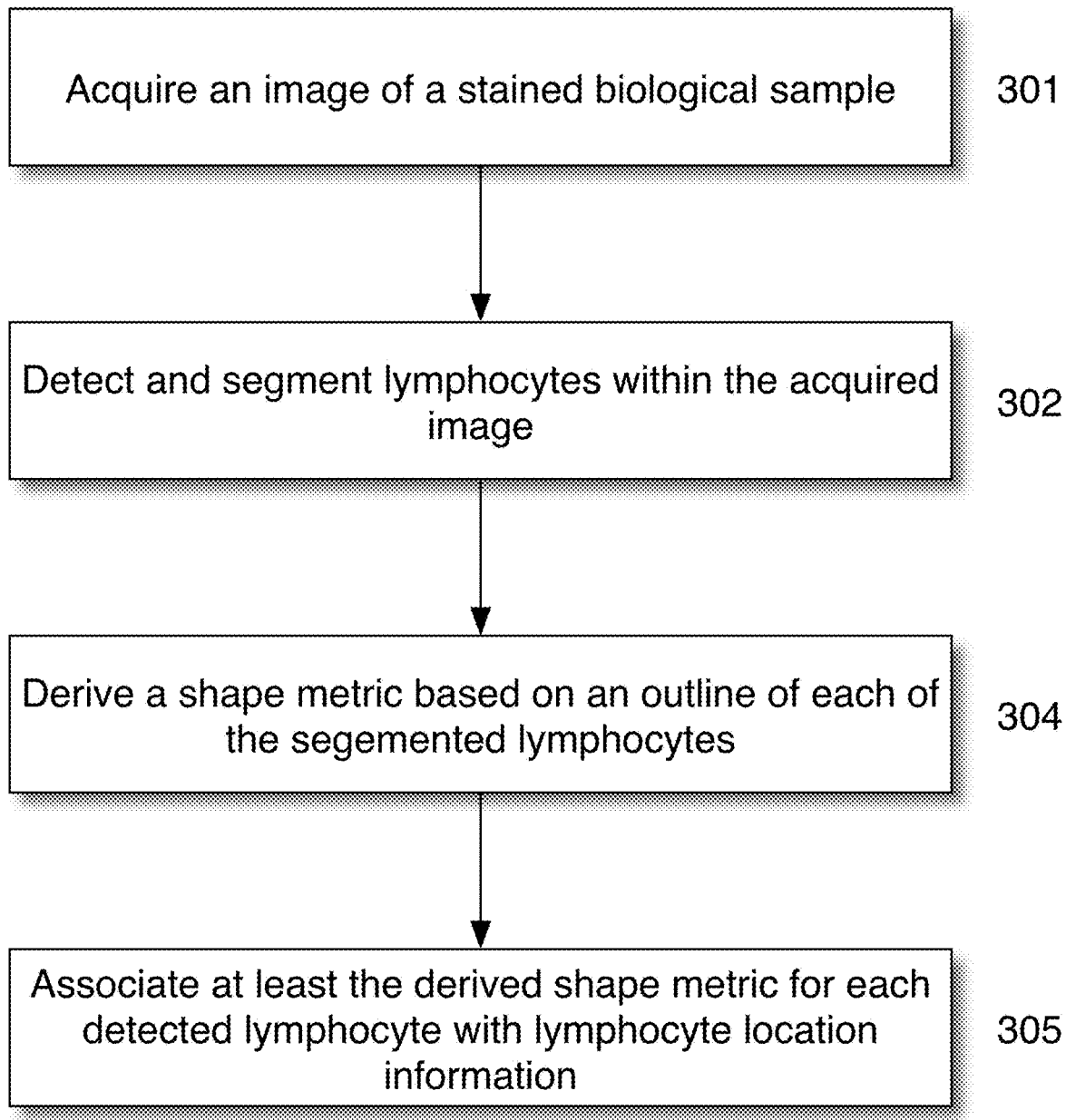
FIG. 3B sets forth a flowchart illustrating the various steps of detecting lymphocytes and deriving a shape metric for each detected lymphocyte, in accordance with some embodiments.

With reference to FIGS. 2, 3A and 3B, the present disclosure provides a computer-implemented method of identifying lymphocytes within an image of a biological sample having at least one stain and deriving at least one shape metric which serves as a surrogate for lymphocyte motility. In some embodiments, the system may include: (a) an imaging module 202 is adapted to generate image data of a stained biological sample (e.g. a sample stained for at least the presence of one lymphocyte biomarker, such as CD3, CD4, CD8, etc.) (step 301); (b) running an unmixing module 203 to provide image channel images corresponding to a particular stain or biomarker, (c) running a cell detection module 204 to at least detect lymphocytes within the image of the stained biological sample (step 302), where the cell detection module 204 includes a trained classifier (e.g. SVM or Random Forest, as described herein); (d) running a segmentation module 205 to generate a foreground segmentation mask based on the detected lymphocytes (step 303); (e) running a shape metric derivation module 207 to compute a shape metric for each detected and segmented lymphocyte (step 304); (f) running a labeling module 208 to generate labels and/or to derive the coordinates of identified lymphocytes; and (g) associating the at least one derived shape metric for each detected and segmented lymphocyte with the respective lymphocyte's coordinate position (e.g. a coordinate of a center seed point or the coordinates of the outline of the lymphocyte) and/or location information. The data may be stored in a database 240 (step 305).

The skilled artisan will also appreciate that additional modules may be incorporated into the workflow as needed. For example, an overlay generation module 209 may be run such that a visual representation of the detected lymphocytes and/or an indicia which corresponds to a value of the derived shape metric may be superimposed over the image (e.g. a color-coded seed center; a color-coded shape; a color coded "filling" of the outline of the detected lymphocyte, etc.). In addition, a cell classification module 206 may be run such that the detected and segmented lymphocytes may be further characterized, e.g. as cytotoxic T cells, helper T cells, etc. Also, a scoring module 210 may be run to score derived image features, e.g. to score a percent positivity, a membrane or nuclear staining intensity (e.g. staining intensity of a lymphocyte biomarker), or to provide an H-score.

Of course, any module may be run more than once. For example, the cell detection module 204 and the cell classification module 206 may be run a first time to detect and classify lymphocytes and then run a second time to detect and classify tumor cells.

The skilled artisan will also appreciate that additional modules or databases not depicted in FIG. 2 may be incorporated into the workflow. For example, an image pre-processing module may be run to apply certain filters to the acquired images or to identify certain histological and/or morphological structures within the tissue samples. In addition, a region of interest selection module may be utilized to select a particular portion of an image for analysis.

Image Acquisition Module

In some embodiments, as an initial step, and with reference to FIG. 2, the digital pathology system 200 runs an imaging module 202 to capture images or image data (such as from a scanning device 12) of a biological sample having one or more stains (step 301). In some embodiments, the images received or acquired are RGB images or multispectral images (e.g. multiplex brightfield and/or dark field images). In some embodiments, the images captured are stored in memory 201.

The images or image data (used interchangeably herein) may be acquired using the scanning device 12, such as in real-time. In some embodiments, the images are acquired from a microscope or other instrument capable of capturing image data of a specimen-bearing microscope slide, as noted herein. In some embodiments, the images are acquired using a 2D scanner, such as one capable of scanning image tiles, or a line scanner capable of scanning the image in a line-by-line manner, such as the VENTANA DP 200 scanner. Alternatively, the images may be images that have been previously acquired (e.g. scanned) and stored in a memory 201 (or, for that matter, retrieved from a server via network 20).

The biological sample may be stained through application of one or more stains, and the resulting image or image data comprises signals corresponding to each of the one or more stains. Indeed, the biological sample may have been stained in a multiplex assay for two or more stains, in addition to or including any counterstains.

As the skilled artisan will appreciate, a biological sample may be stained for different types of nuclei and/or cell membrane biomarkers. Methods for staining tissue structures and guidance in the choice of stains appropriate for various purposes are discussed, for example, in "Sambrook et al., Molecular Cloning: A Laboratory Manual, Cold Spring Harbor Laboratory Press (1989)" and "Ausubel et al., Current Protocols in Molecular Biology, Greene Publishing Associates and Wiley-Intersciences (1987)," the disclosures of which are incorporated herein by reference.

In some embodiments, the biological samples are stained for at least two biomarkers. In other embodiments, the biological samples are stained for the presence of at least two biomarkers and also stained with a primary stain (e.g. hematoxylin). In some embodiments, the biological samples are stained for the presence of at least two lymphocyte biomarkers. In other embodiments, the biological samples are stained for the presence of at least two lymphocyte biomarkers and for the presence of an additional biomarker allowing to facilitate further lymphocyte differentiation. In yet other embodiments, the biological samples are stained for the presence of at least two lymphocyte biomarkers and for the presence of at least one tumor biomarker. In further embodiments, the biological samples are stained for the presence of at least two lymphocyte biomarkers, an additional biomarker to facilitate lymphocyte differentiation, and for the presence of at least one tumor biomarker.

In some embodiments, the samples are stained for the presence of at least a lymphocyte marker. Lymphocyte markers include CD3, CD4, and CD8. In general, CD3 is the "universal marker" for T cells. In some embodiments, further analysis (staining) is performed to identify a specific type of T cell, e.g. regulatory, helper, or cytotoxic T cell. For example, CD3+ T-cells can be further distinguished as being cytotoxic T-lymphocytes positive for the CD8 biomarker (CD8 is a specific marker for cytotoxic T lymphocytes). CD3+ T cells can also be distinguished as being cytotoxic T-lymphocytes positive for Perforin (Perforin is a membranolytic protein that is expressed in the cytoplasmic granules of cytotoxic T cells and natural killer cells). Cytotoxic T cells are effector cells that actually "kill" tumor cells. They are believed to act by direct contact to introduce the digestive enzyme granzyme B into the tumor cell cytoplasm, thereby killing it. Similarly, CD3+ T cells can be further distinguished as regulatory T cells positive for the FOXP3 biomarker. FOXP3 is a nuclear transcription factor that is the most specific marker for regulatory T cells. Likewise, CD3+ T cells may be further distinguished as helper T cells positive for the CD4 biomarker.

In view of the foregoing, the sample is stained for one or more immune cell markers including at least CD3 or total lymphocytes as detected by hematoxylin & eosin staining. In some embodiments, at least one additional T cell specific marker may also be included, such as CD8 (marker for cytotoxic T-lymphocytes), CD4 (marker for helper T-lymphocytes), FOXP3 (marker for regulatory T-lymphocytes), CD45RA (marker for naïve T-lymphocytes), and CD45RO (marker for memory T-lymphocytes). In one specific embodiment, at least two markers including human CD3 (or total lymphocytes as detected by H&E staining) and human CD8 are used, in which case a single section of the tumor tissue may be labeled with both markers, or serial sections may be used. In other cases, at least one of the immune cell biomarkers is lymphocytes identified in a hematoxylin & eosin stained section.

In some embodiments, the samples are stained for the presence of a lymphocyte biomarker and a tumor biomarker. For example, in epithelial tumors (carcinomas), cytokeratin staining identifies tumor cells as well as the normal epithelium. This information, together with the fact that tumor cells abnormally overexpress the cytokeratins compared to normal epithelial cells, allows one to identify tumor versus normal tissue. For melanoma tissue of neuroectodermal origin, the S100 biomarker serves a similar purpose.

T-cells, for example CD8-positive cytotoxic T-cells, can be further distinguished by a variety of biomarkers that include PD-1, TIM-3, LAG-3, CD28, and CD57. As such, in some embodiments, T-cells are stained with at least one of a variety of lymphocyte biomarkers (e.g., CD3, CD4, CD8, FOXP3) for their identification, and additional biomarkers (LAG-3, TIM-3, PD-L1, etc.) for further differentiation.

In some embodiments, the biological samples are stained for a lymphocyte biomarker and PD-L1. For example, tumor cells can be distinguished as being positive for the biomarker PD-L1, which is believed to impact the interaction of tumor cells and immune cells.

Chromogenic stains may comprise Hematoxylin, Eosin, Fast Red, or 3,3'-Diaminobenzidine (DAB). In some embodiments, the tissue sample is stained with a primary stain (e.g. hematoxylin). In some embodiments, the tissue sample is also stained with a secondary stain (e.g. eosin). In some embodiments, the tissue sample is stained in an IHC assay for a particular biomarker. Of course, the skilled artisan will appreciate that any biological sample may also be stained with one or more fluorophores.

A typical biological sample is processed in an automated staining/assay platform that applies a stain to the sample. There are a variety of commercial products on the market suitable for use as the staining/assay platform, one example being the Discovery™ product of Ventana Medical Systems, Inc. (Tucson, AZ). The camera platform may also include a bright field microscope, such as the VENTANA iScan HT or the VENTANA DP 200 scanners of Ventana Medical Systems, Inc., or any microscope having one or more objective lenses and a digital imager. Other techniques for capturing images at different wavelengths may be used. Further camera platforms suitable for imaging stained biological specimens are known in the art and commercially available from companies such as Zeiss, Canon, Applied Spectral Imaging, and others, and such platforms are readily adaptable for use in the system, methods and apparatus of this subject disclosure.

In some embodiments, the input images are masked such that only tissue regions are present in the images. In some embodiments, a tissue region mask is generated to mask non-tissue regions from tissue regions. In some embodiments, a tissue region mask may be created by identifying the tissue regions and automatically or semi-automatically (i.e., with minimal user input) excluding the background regions (e.g. regions of a whole slide image corresponding to glass with no sample, such as where there exists only white light from the imaging source). The skilled artisan will appreciate that in addition to masking non-tissue regions from tissue regions, the tissue masking module may also mask other areas of interest as needed, such as a portion of a tissue identified as belonging to a certain tissue type or belonging to a suspected tumor region. In some embodiments, a segmentation technique is used to generate the tissue region masked images by masking tissue regions from non-tissue regions in the input images. Suitable segmentation techniques are as such known from the prior art, (cf. Digital Image Processing, Third Edition, Rafael C. Gonzalez, Richard E. Woods, chapter 10, page 689 and Handbook of Medical Imaging, Processing and Analysis, Isaac N.

Bankman Academic Press, 2000, chapter 2). In some embodiments, an image segmentation technique is utilized to distinguish between the digitized tissue data and the slide in the image, the tissue corresponding to the foreground and the slide corresponding to the background. In some embodiments, the component computes the Area of Interest (AOI) in a whole slide image in order to detect all tissue regions in the AOI while limiting the amount of background non-tissue area that is analyzed. A wide range of image segmentation techniques (e.g., HSV color-based image segmentation, Lab image segmentation, mean-shift color image segmentation, region growing, level set methods, fast marching methods, etc.) can be used to determine, for example, boundaries of the tissue data and non-tissue or background data. Based at least in part on the segmentation, the component can also generate a tissue foreground mask that can be used to identify those portions of the digitized slide data that correspond to the tissue data. Alternatively, the component can generate a background mask used to identify those portions of the digitized slide date that do not correspond to the tissue data.

This identification may be enabled by image analysis operations such as edge detection, etc. A tissue region mask may be used to remove the non-tissue background noise in the image, for example the non-tissue regions. In some embodiments, the generation of the tissue region mask comprises one or more of the following operations (but not limited to the following operations): computing the luminance of the low resolution analysis input image, producing a luminance image, applying a standard deviation filter to the luminance image, producing a filtered luminance image, and applying a threshold to filtered luminance image, such that pixels with a luminance above a given threshold are set to one, and pixels below the threshold are set to zero, producing the tissue region mask. Additional information and examples relating to the generation of tissue region masks is disclosed in US Publication No. 2017/0154420, entitled "An Image Processing Method and System for Analyzing a Multi-Channel Image Obtained from a Biological Tissue Sample Being Stained by Multiple Stains," the disclosure of which is hereby incorporated by reference herein in its entirety.

In some embodiments, a region of interest identification module may be used to select a portion of the biological sample for which image data should be acquired, e.g. a region of interest having a large concentration of lymphocytes cells or a region suspected of having a large concentration of lymphocytes. Methods of determining a region of interest are described in US Publication No. 2017/0154420, the disclosure of which is hereby incorporated by reference herein in its entirety. In general, the US Publication No. 2017/0154420 discloses: an image processing method for analyzing a multi-channel image obtained from a biological tissue sample being stained by multiple stains, the method comprising: a. unmixing the multi-channel image to provide one unmixed image per channel, b. spatial low pass filtering of at least one of the unmixed images, c. local maximum filtering of the at least one of the spatial low pass filtered unmixed images, d. thresholding the at least one of the spatial low pass filtered unmixed images to identify at least one set of neighboring pixels, and e. defining a region of interest by extracting an image portion of the multi-channel image from an image location given by the set of neighboring pixels, the region of interest having a predetermined size and shape.

Unmixing Module

In some embodiments, the images received as input may be multiplex images, i.e. the image received is of a biological sample stained with more than one stain (e.g. an image stained for the presence of the CD3, CD8, and PD-L1 biomarkers). In these embodiments, and prior to further processing, the multiple image is first unmixed into its constituent channels, such as with an unmixing module 203, where each unmixed channel corresponds to a particular stain or signal (e.g. in the above example, a CD3 "stain" image change, a CD8 "stain" image channel, and a PD-L1 "stain" image channel). In some embodiments, the unmixed images (often referred to as "channel images" or "image channel images") and may be used as the input for each module described herein.

In some embodiments, in a sample comprising one or more stains, individual images may be produced for each channel of the one or more stains. Without wishing to be bound by any particular theory, it is believed that these channels highlight different tissue structures in the tissue image, thus, they may be referred to as structural image channels. For example, for a sample stained with hematoxylin and for the presence of the CD3 (e.g. stained red using Fast Red) and Perforin (e.g. stained brown using DAB), unmixing would provide at least a hematoxylin image channel image, a CD3/red image change image, and a Perforin/brown image channel image. The skilled artisan will appreciate that features extracted from these channels are useful in describing the different biological structures present within any image of a tissue (e.g. nuclei, membranes, cytoplasm, etc.).

The multi-spectral image provided by the imaging module 202 is a weighted mixture of the underlying spectral signals associated the individual biomarkers and noise components. At any particular pixel, the mixing weights are proportional to the biomarker expressions of the underlying co-localized biomarkers at the particular location in the tissue and the background noise at that location. Thus, the mixing weights vary from pixel to pixel. The spectral unmixing methods disclosed herein decompose the multi-channel pixel value vector at each and every pixel into a collection of constituent biomarker end members or components and estimate the proportions of the individual constituent stains for each of the biomarkers.

Unmixing is the procedure by which the measured spectrum of a mixed pixel is decomposed into a collection of constituent spectra, or endmembers, and a set of corresponding fractions, or abundances, that indicate the proportion of each endmember present in the pixel. Specifically, the unmixing process can extract stain-specific channels to determine local concentrations of individual stains using reference spectra that are well known for standard types of tissue and stain combinations. The unmixing may use reference spectra retrieved from a control image or estimated from the image under observation. Unmixing the component signals of each input pixel enables retrieval and analysis of stain-specific channels, such as a hematoxylin channel and an eosin channel in H&E images, or a diaminobenzidine (DAB) channel and a counterstain (e.g., hematoxylin) channel in IHC images. The terms "unmixing" and "color deconvolution" (or "deconvolution") or the like (e.g. "deconvolving," "unmixed") are used interchangeably in the art.

In some embodiments, the multiplex images are unmixed with unmixing module 205 using linear unmixing. Linear unmixing is described, for example, in 'Zimmermann "Spectral Imaging and Linear Unmixing in Light Microscopy" Adv Biochem Engin/Biotechnology (2005) 95:245-265' and in in C. L. Lawson and R. J. Hanson, "Solving least squares Problems," PrenticeHall, 1974, Chapter 23, p. 161,' the disclosures of which are incorporated herein by reference in their entirety. In linear stain unmixing, the measured spectrum ($S(\lambda)$) at any pixel is considered a linear mixture of stain spectral components and equals the sum of the proportions or weights (A) of each individual stain's color reference ($R(\lambda)$) that is being expressed at the pixel $$S(\lambda)=A_1 \cdot R_1(\lambda)+A_2 \cdot R_2(\lambda)+A_3 \cdot R_3(\lambda) \ldots A_i \cdot r y(\lambda)$$

which can be more generally expressed as in matrix form as $$S(\lambda)=\Sigma A_i r y(\lambda) \text{ or } S=R \cdot A$$

If there are M channels images acquired and N individual stains, the columns of the M×N matrix R are the optimal color system as derived herein, the N×1 vector A is the unknown of the proportions of individual stains and the M×1 vector S is the measured multichannel spectral vector at a pixel. In these equations, the signal in each pixel (S) is measured during acquisition of the multiplex image and the reference spectra, i.e. the optimal color system, is derived as described herein. The contributions of various stains ($A_j$) can be determined by calculating their contribution to each point in the measured spectrum. In some embodiments, the solution is obtained using an inverse least squares fitting approach that minimizes the square difference between the measured and calculated spectra by solving the following set of equations, $$[\partial \Sigma_j \{S(\lambda_j) - \Sigma_i A_i r y(\lambda_j)\}2]/\partial A_i = 0$$

In this equation, j represents the number of detection channels and i equals the number of stains. The linear equation solution often involves allowing a constrained unmixing to force the weights (A) to sum to unity.

In other embodiments, unmixing is accomplished using the methods described in WO2014/195193, entitled "Image Adaptive Physiologically Plausible Color Separation," filed on May 28, 2014, the disclosure of which is hereby incorporated by reference in its entirety herein. In general, WO2014/195193 describes a method of unmixing by separating component signals of the input image using iteratively optimized reference vectors. In some embodiments, image data from an assay is correlated with expected or ideal results specific to the characteristics of the assay to determine a quality metric. In the case of low quality images or poor correlations against ideal results, one or more reference column vectors in matrix R are adjusted, and the unmixing is repeated iteratively using adjusted reference vectors, until the correlation shows a good quality image that matches physiological and anatomical requirements. The anatomical, physiological, and assay information may be used to define rules that are applied to the measured image data to determine the quality metric. This information includes how the tissue was stained, what structures within the tissue were intended or not intended to be stained, and relationships between structures, stains, and markers specific to the assay being processed. An iterative process results in stain-specific vectors that can generate images that accurately identify structures of interest and biologically relevant information, are free from any noisy or unwanted spectra, and therefore fit for analysis. The reference vectors are adjusted to within a search space. The search space defines a range of values that a reference vector can take to represent a stain. The search space may be determined by scanning a variety of representative training assays including known or commonly occurring problems and determining high-quality sets of reference vectors for the training assays.

In other embodiments, unmixing is accomplished using the methods described in WO2015/124772, entitled "Group Sparsity Model for Image Unmixing," filed on Feb. 23, 2015, the disclosure of which is hereby incorporated by reference in its entirety herein. In general, WO2015/124772 describes unmixing using a group sparsity framework, in which fractions of stain contributions from a plurality of colocation markers are modeled within a "same group" and fractions of stain contributions from a plurality of non-colocation markers are modeled in different groups, providing co-localization information of the plurality of colocation markers to the modeled group sparsity framework, solving the modeled framework using a group lasso to yield a least squares solution within each group, wherein the least squares solution corresponds to the unmixing of the colocation markers, and yielding a sparse solution among the groups that corresponds to the unmixing of the non-colocation markers. Moreover, WO2015124772 describes a method of unmixing by inputting image data obtained from the biological tissue sample, reading reference data from an electronic memory, the reference data being descriptive of the stain color of each one of the multiple stains, reading colocation data from electronic memory, the colocation data being descriptive of groups of the stains, each group comprising stains that can be collocated in the biological tissue sample, and each group forming a group for the group lasso criterion, at least one of the groups having a size of two or above, and calculating a solution of the group lasso criterion for obtaining the unmixed image using the reference data as a reference matrix. In some embodiments, the method for unmixing an image may comprise generating a group sparsity model wherein a fraction of a stain contribution from colocalized markers is assigned within a single group and a fraction of a stain contribution from non-colocalized markers is assigned within separate groups and solving the group sparsity model using an unmixing algorithm to yield a least squares solution within each group.

Cell Detection and Cell Classification Modules

Following image acquisition and/or unmixing, input images or unmixed image channel images are provided to a cell detection module 204 to detect cells and (optionally) subsequently to a cell classification module 206. In some embodiments, the cell detection module 204 is utilized to detect lymphocytes (step 302) within the image based on features within the stained biological sample as noted herein. The procedures and algorithms described herein may be adapted to identify and classify various types of cells or cell nuclei, not just lymphocytes, based on features within the input images, including identifying and classifying tumor cells, non-tumor cells, stroma cells, and non-target stain, etc. The skilled artisan will also appreciate that although lymphocyte detection may occur initially, tumor cells or other types of cells may also be detected either simultaneously or sequentially.

General Methods

In some embodiments, one or more features or metrics (examples are enumerated herein) are derived by detecting nuclei within the input image and/or by extracting features from the detected nuclei and/or from cell membranes (depending, of course, on the biomarker(s) utilized within the input image). In other embodiments, metrics are derived by analyzing cell membrane staining, cell cytoplasm staining, and/or punctuate staining (e.g. to distinguish between membrane-staining areas and non-membrane staining areas). As used herein, the term "cytoplasmic staining" refers to a group of pixels arranged in a pattern bearing the morphological characteristics of a cytoplasmic region of a cell. As used herein, the term "membrane staining" refers to a group of pixels arranged in a pattern bearing the morphological characteristics of a cell membrane. As used herein, the term "punctate staining" refers to a group of pixels with strong localized intensity of staining appearing as spots/dots scattering on the membrane area of the cell. The skilled artisan will appreciate that the nucleus, cytoplasm, and membrane of a cell have different characteristics and that differently stained tissue samples may reveal different biological features. Indeed, the skilled artisan will appreciate that certain cell surface receptors can have staining patterns localized to the membrane or localized to the cytoplasm. Thus, a "membrane" staining pattern may be analytically distinct from a "cytoplasmic" staining pattern. Likewise, a "cytoplasmic" staining pattern and a "nuclear" staining pattern may be analytically distinct.

In some embodiments, the images received as input are processed such as to detect nucleus centers (seeds) and/or to segment the nuclei. For example, instructions may be provided to detect nucleus centers based on radial-symmetry voting using techniques commonly known to those of ordinary skill in the art (see Parvin, Bahram, et al. "Iterative voting for inference of structural saliency and characterization of subcellular events." Image Processing, IEEE Transactions on 16.3 (2007): 615-623, the disclosure of which is incorporated by reference in its entirety herein). In some embodiments, nuclei are detected using radial symmetry to detect centers of nuclei and then the nuclei are classified based on the intensity of stains around the cell centers. For example, an image magnitude may be computed within an image and one or more votes at each pixel are accumulated by adding the summation of the magnitude within a selected region. Mean shift clustering may be used to find the local centers in the region, with the local centers representing actual nuclear locations.

Nuclei detection based on radial symmetry voting is executed on color image intensity data and makes explicit use of the a priori domain knowledge that the nuclei are elliptical shaped blobs with varying sizes and eccentricities. To accomplish this, along with color intensities in the input image, image gradient information is also used in radial symmetry voting and combined with an adaptive segmentation process to precisely detect and localize the cell nuclei. A "gradient" as used herein is, for example, the intensity gradient of pixels calculated for a particular pixel by taking into consideration an intensity value gradient of a set of pixels surrounding said particular pixel. Each gradient may have a particular "orientation" relative to a coordinate system whose x- and y-axis are defined by two orthogonal edges of the digital image. For instance, nuclei seed detection involves defining a seed as a point which is assumed to lie inside a cell nucleus and serve as the starting point for localizing the cell nuclei. The first step is to detect seed points associated with each cell nuclei using a highly robust approach based on the radial symmetry to detect elliptical-shaped blobs, structures resembling cell nuclei. The radial symmetry approach operates on the gradient image using a kernel-based voting procedure. A voting response matrix is created by processing each pixel that accumulates a vote through a voting kernel. The kernel is based on the gradient direction computed at that particular pixel and an expected range of minimum and maximum nucleus size and a voting kernel angle (typically in the range [π/4, π/8]). In the resulting voting space, local maxima locations that have a vote value higher than a predefined threshold value are saved out as seed points. Extraneous seeds may be discarded later during subsequent segmentation or classification processes. An example of a radial symmetry-based nuclei detection operation is described within WO/2014/140085A1, the disclosure of which is incorporated herein by reference in its entirety. Other such methods are discussed in US Patent Publication No. 2017/0140246, the disclosure of which is again incorporated by reference herein.

In some embodiments, once the seeds are detected, a locally adaptive thresholding method may be used, and blobs around the detected centers are created. In some embodiments, other methods may also be incorporated, such as marker-based watershed algorithms can also be used to identify the nuclei blobs around the detected nuclei centers. These and other methods are described in co-pending application PCT/EP2016/051906, published as WO2016/120442, the disclosure of which is incorporated by reference herein in its entirety. A "blob" as used herein can be, for example, a region of a digital image in which some properties, e.g. the intensity or grey value, are constant or vary within a prescribed range of values. All pixels in a blob can be considered in some sense to be similar to each other. For example, blobs may be identified using differential methods which are based on derivatives of a function of position on the digital image, and methods based on local extrema. A nuclear blob is a blob whose pixels and/or whose outline shape indicate that the blob was probably generated by a nucleus stained with the first stain. For example, the radial symmetry of a blob could be evaluated to determine if the blob should be identified as a nuclear blob or as any other structure, e.g. a staining artifact. For example, in case a blob has a lengthy shape and is not radially symmetric, said blob may not be identified as a nuclear blob but rather as a staining artifact. Depending on the embodiment, a blob identified to be a "nuclear blob" may represent a set of pixels which are identified as candidate nuclei, and which may be further analyzed for determining if said nuclear blob represents a nucleus. In some embodiments, any kind of nuclear blob is directly used as an "identified nucleus."

In some embodiments, filtering operations are applied on the identified nuclei or nuclear blobs for identifying nuclei which do not belong to biomarker-positive tumor cells and for removing said identified non-tumor nuclei from the list of already identified nuclei or not adding said nuclei to the list of identified nuclei from the beginning. Of course, filtering may be performed to retain non-tumor nuclei (e.g. lymphocytes) and exclude tumor nuclei such that non-tumor nuclei (e.g. lymphocytes) may be detected and/or classified. By way of example, additional spectral and/or shape features of the identified nuclear blob may be analyzed to determine if the nucleus or nuclear blob is a nucleus of a tumor cell or not. For example, the nucleus of a lymphocyte is larger than the nucleus of other tissue cell, e.g. of a lung cell. In case the tumor cells are derived from a lung tissue, nuclei of lymphocytes are identified by identifying all nuclear blobs of a minimum size or diameter which is significantly larger than the average size or diameter of a normal lung cell nucleus. The identified nuclear blobs relating to the nuclei of lymphocytes may be removed (i.e., "filtered out from") the set of already identified nuclei. By filtering out the nuclei of non-tumor cells, the accuracy of the method may be increased. Depending on the biomarker, also non-tumor cells may express the biomarker to a certain extent and may therefore produce an intensity signal in the first digital image which does not stem from a tumor cell. By identifying and filtering out nuclei which do not belong to tumor cells from the totality of the already identified nuclei, the accuracy of identifying biomarker-positive tumor cells may be increased. These and other methods are described in US Patent Publication 2017/0103521, the disclosure of which is incorporated by reference herein in its entirety.

In some embodiments, the detected nuclei (such as those detected using radial symmetry voting) are then subsequently segmented using thresholds individually computed for each nucleus. For example, Otsu's method may be used for segmentation in a region around an identified nucleus since it is believed that the pixel intensity in the nuclear regions varies. As will be appreciated by those of ordinary skill in the art, Otsu's method is used to determine an optimal threshold by minimizing the intra-class variance and is known to those of skill in the art. More specifically, Otsu's method is used to automatically perform clustering-based image thresholding or, the reduction of a gray level image to a binary image. The algorithm assumes that the image contains two classes of pixels following a bi-modal histogram (foreground pixels and background pixels). It then calculates the optimum threshold separating the two classes such that their combined spread (intra-class variance) is minimal, or equivalent (because the sum of pairwise squared distances is constant), so that their inter-class variance is maximal.

Lymphocyte Specific Methods

Methods of detecting lymphocytes and tumor infiltrating lymphocytes are described by Basavanhally et al. and Fatakdawala, H. et al. In Basavanhally et al., "Computerized image-based detection and grading of lymphocytic infiltration in HER2+ breast cancer histopathology," IEEE Transactions on Biomedical Engineering 57, 642-653 (2010) (the disclosure of which is hereby incorporated by reference herein in its entirety) region growing with high sensitivity and low specificity is used to initially segment lymphocyte nuclei and other objects. Then, maximum a posteriori (MAP) estimation that incorporates size, luminance and spatial proximity information is used to improve the specificity of the detector. Finally, the results from the lymphocyte nuclei detection are input to a classifier that discriminates between the lymphocyte infiltration phenomenon and the baseline level of lymphocytes.

In Fatakdawala, H. et al., "Expectation-maximization-driven geodesic active contour with overlap resolution (EMaGACOR): application to lymphocyte segmentation on breast cancer histopathology," IEEE Transactions on Biomedical Engineering 57, 1676-1689 (2010) (the disclosure of which is incorporated by reference herein in its entirety) output from a Gaussian mixture clustering algorithm is used to initialize geodesic active contour segmentation. The overlapping objects are resolved by splitting them along high concavity points. Lymphocyte nuclei are distinguished from other objects by texture-based clustering. More specifically, the methods of Fatakdawala utilize RGB values to create a Gaussian mixture model (GMM), wherein an input image is partitioned into four types of regions corresponding to the structures of breast cancer nuclei, lymphocyte nuclei, stroma, and background, respectively. The final membership of each pixel is determined as the one corresponding to the maximum posterior probability. The procedure of lymphocyte nucleus segmentation can be summarized as: 1) segment the image into the four categories of regions using a parametric expectation-maximization algorithm, 2) extract component boundaries using the magnetostatic active contour model [234] with EM-generated segmentation as initialization, 3) split touching nuclei with a concave point detection based shortest path searching algorithm, and 4) discriminate lymphocytes from the others by using K-means clustering with the first-order statistical texture features calculated from the segmented nuclei.

Other methods of detecting lymphocytes are described in U.S. Patent Application Publication No. 2016/0363593, entitled "Methods, Kits, and Systems for Scoring the Immune Response to Cancer," the disclosure of which is hereby incorporated by reference herein in its entirety.

Classification

In some embodiments, after candidate nuclei are identified, they may be further analyzed to distinguish tumor nuclei from other candidate nuclei (e.g. lymphocyte nuclei and stroma nuclei). In some embodiments, a learnt supervised classifier may be trained to distinguish between different classes of non-tumor nuclei. In some embodiments, the learnt supervised classifier is a Support Vector Machine ("SVM"). In general, a SVM is a classification technique, which is based on statistical learning theory where a non-linear input data set is converted into a high dimensional linear feature space via kernels for the non-linear case. A support vector machines project a set of training data, E, that represents two different classes into a high-dimensional space by means of a kernel function, K. In this transformed data space, nonlinear data are transformed so that a flat line can be generated (a discriminating hyperplane) to separate the classes so as to maximize the class separation. Testing data are then projected into the high-dimensional space via K, and the test data (such as the features or metrics enumerated below) are classified on the basis of where they fall with respect to the hyperplane. The kernel function K defines the method in which data are projected into the high-dimensional space.

In some embodiments, the learnt supervised classifier used to identify tumor nuclei and non-tumor nuclei is a random forest classifier. For example, the random forest classifier may be trained by: (i) creating a training set of tumor and non-tumor nuclei, (ii) extracting features for each nucleus, and (iii) training the random forest classifier to distinguish between tumor nuclei and non-tumor nuclei based on the extracted features (such as those features enumerated herein). The trained random forest classifier may then be applied to classify the nuclei in a test image into tumor nuclei and non-tumor nuclei. Optionally, the random forest classifier may be further trained to distinguish between different classes of non-tumor nuclei, such as lymphocyte nuclei and stromal nuclei (and even between different types of lymphocytes).

Features or metrics which may be derived from input images are enumerated below. After the features are derived, they may be used alone or in conjunction with training data (e.g. during training, example cells are presented together with a ground truth identification provided by an expert observer according to procedures known to those of ordinary skill in the art) to classify nuclei or cells (tumor cells, lymphocytes, etc.).

(A) Metrics Derived from Morphology Features

A "morphology feature" as used herein is, for example, a feature being indicative of the shape or dimensions of a nucleus. Morphological features provide some information about the size and shape of a cell or its nucleus. For example, a morphology feature may be computed by applying various image analysis algorithms on pixels contained in or surrounding a nuclear blob or seed. In some embodiments, the morphology features include area, minor, and major axis lengths, perimeter, radius, solidity, etc.

(B) Metrics Derived from Appearance Features

An "appearance feature" as used herein is, for example, a feature having been computed for a particular nucleus by comparing pixel intensity values of pixels contained in or surrounding a nuclear blob or seed used for identifying the nucleus, whereby the compared pixel intensities are derived from different image channels (e.g. a background channel, a channel for the staining of a biomarker, etc.). In some embodiments, the metrics derived from appearance features are computed from percentile values (e.g. the 10th, 50th, and 95th percentile values) of pixel intensities and of gradient magnitudes computed from different image channels. For example, at first, a number P of X-percentile values (X=10, 50, 95) of pixel values of each of a plurality IC of image channels (e.g. three channels: HTX, DAB, luminance) within a nuclear blob representing the nucleus of interest are identified. Computing appearance feature metrics may be advantageous since the derived metrics may describe the properties of the nuclear regions as well as describe the membrane region around the nuclei.

(C) Metrics Derived from Background Features

A "background feature" is, for example, a feature being indicative of the appearance and/or stain presence in cytoplasm and cell membrane features of the cell comprising the nucleus for which the background feature was extracted from the image. A background feature and a corresponding metrics can be computed for a nucleus and a corresponding cell depicted in a digital image e.g. by identifying a nuclear blob or seed representing the nucleus; analyzing a pixel area (e.g. a ribbon of 20 pixels–about 9 microns–thickness around the nuclear blob boundary) directly adjacent to the identified set of cells are computed in, therefore capturing appearance and stain presence in cytoplasm and membrane of the cell with this nucleus together with areas directly adjacent to the cell. These metrics are similar to the nuclear appearance features but are computed in a ribbon of about 20 pixels (about 9 microns) thickness around each nucleus boundary, therefore capturing the appearance and stain presence in the cytoplasm and membrane of the cell having the identified nucleus together with areas directly adjacent to the cell. It is believed that the ribbon size is selected because it is believed that it captures a sufficient amount of background tissue area around the nuclei that can be used to provide useful information for nuclei discrimination. These features are similar to those disclosed by "J. Kong, et al., "A comprehensive framework for classification of nuclei in digital microscopy imaging: An application to diffuse gliomas," in ISBI, 2011, pp.2128-2131" the disclosure of which is incorporated by reference in its entirety herein. It is believed that these features may be used to determine whether the surrounding tissue is stroma or epithelium (such as in H&E stained tissue samples). It is believed that these background features also capture membrane staining patterns, which are useful when the tissue samples are stained with appropriate membrane staining agents.

(D) Metrics Derived from Color

In some embodiments, metrics derived from color include color ratios, R/(R+G+B). or color principal components. In other embodiments, metrics derived from color include local statistics of each of the colors (mean/median/variance/std dev) and/or color intensity correlations in a local image window.

(E) Metrics Derived from Intensity Features

The group of adjacent cells with certain specific property values is set up between the dark and the white shades of grey colored cells represented in a histopathological slide image. The correlation of the color feature defines an instance of the size class, thus this way the intensity of these colored cells determines the affected cell from its surrounding cluster of dark cells. Examples of texture features are described in PCT Publication No. WO/2016/075095, the disclosure of which is incorporated by reference herein in its entirety.

(F) Spatial Features

In some embodiments, spatial features include a local density of cells; average distance between two adjacent detected cells; and/or distance from a cell to a segmented region.

(G) Metrics Derived from Nuclear Features

The skilled artisan will also appreciate that metrics may also be derived from nuclear features. The computation of such nuclear features is described by Xing et al. "Robust Nucleus/Cell Detection and Segmentation in Digital Pathology and Microscopy Images: A Comprehensive Review," IEEE Rev Biomed Eng 9, 234-263, January 2016, the disclosure of which is hereby incorporated by reference herein in its entirety. Of course, other features, as known to those of ordinary skill in the art, may be considered and used as the basis for computation of features.

Segmentation Module

After the lymphocytes are detected (step 302) and optionally classified, a foreground segmentation mask may be computed (step 303) using segmentation module 205 such that only the identified lymphocytes are visualized. In some embodiments, the foreground segmentation mask is generated using the methods described in United States Patent Application Publication No. 2017/0337596. In particular, US 2017/0337596 describes computing a foreground segmentation by (1) applying filters to enhance the image such that (a) image regions unlikely to have cells are discarded, and (b) cells within a local region are identified; and (2) further applying optional filters to selectively remove artifacts, remove small blobs, remove discontinuities, fill holes, and split up bigger blobs. In some embodiments, the filters applied are selected from the group consisting of a global thresholding filter, a locally adaptive thresholding filter, morphological operation filters, and watershed transformation filters. In some embodiments, the global thresholding filter is applied first, followed by application of the locally adaptive thresholding filter. In some embodiments, the optional filters to selectively remove artifacts, remove small blobs, remove discontinuities, fill holes, and split up bigger blobs are applied after application of the locally adaptive thresholding filter. In some embodiments, the identification of the individual nuclei further comprises performing a connected-components labeling process on the filtered input image.

In some embodiments, the foreground segmentation mask, when applied to the original image or an unmixed image channel image, allows for the visualization and identification of detected lymphocytes (and that other cell types may be excluded from the mask). In some embodiments, the lymphocytes may be visualized as an outline. The skilled artisan will appreciate that by having an outline or trace of all identified lymphocytes, that an area of each lymphocyte may be calculated.

Shape Metric Determination Module

Following the detection and segmentation of lymphocytes using the image analysis module (steps 302 and 303), a shape metric is derived (step 304) for each identified lymphocyte using the shape metric derivation module 207. Essentially, the shape metric is computed such that it provides meaningful data pertaining to the shape of the detected and segmented lymphocytes. In some embodiments, the shape metric is derived such that it provides meaningful data pertaining to an elongate shape of a cell (an "elongateness"). Various shape metrics may be derived that may be used as a surrogate for cell shape (and hence motility). In some embodiments, the shape metrics are selected from the group consisting of a minor axis/major axis aspect ratio, an eccentricity parameter, a circularity parameter, a roundness parameter, or a solidity parameter.

Figure 4:
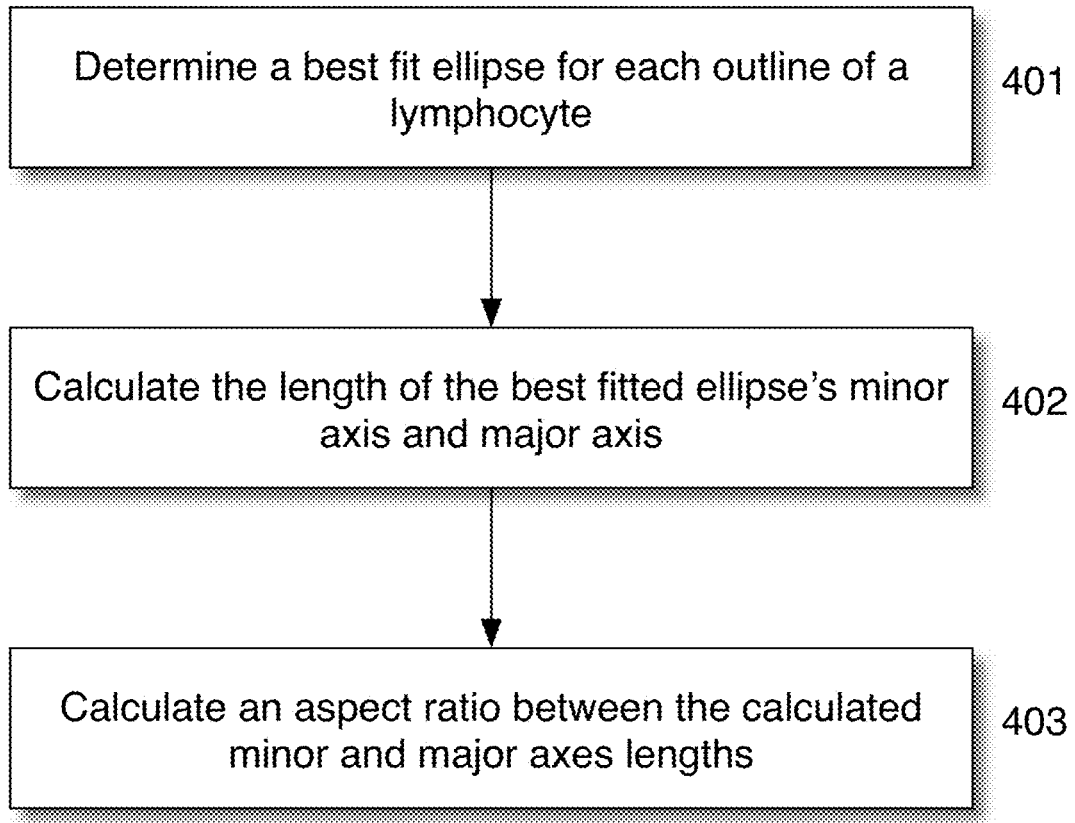
FIG. 4 sets forth a flowchart illustrating one method of deriving a shape metric for detected lymphocytes, in accordance with some embodiments.

In some embodiments, the shape metric is a minor axis/major axis aspect ratio of a best fit ellipse. Initially, and with reference to FIG. 4, an ellipse is fitted to each lymphocyte, e.g. by fitting an ellipse within an outline provided by a foreground segmentation mask (step 401). Methods of fitting an ellipse to a lymphocyte or an outline are described below. From a best fit ellipse, the length measurements of a major axis and the length measurement of a minor axis may be measured (step 402). The major axis is the longest diameter of a best fit ellipse. On the other hand, a minor axis is the shortest diameter of the same ellipse. In this way, the length of the major and minor axes of the fitted ellipse is a robust measure to obtain an estimate of the largest and shortest extents of a cell's shape. An aspect ratio between the two length measurements may then be ascertained (step 403). For example, the aspect ratio can be characterized by the following equation: "minor axis length"/"major axis length"

The ratio of the minor axis length to the major axis length is 1.0 for a symmetric object like a disk. The skilled artisan will appreciate that the value of the aspect ratio becomes smaller and approaches zero for more elongated objects. In short, the minor axis length/major axis length aspect ratio may serve as a robust metric for the shape of the cell and serve as a surrogate for cell motility, e.g. an aspect ratio approaching one may be indicative of a lymphocyte that is not motile, while an aspect ratio approaching zero may be indicative of a lymphocyte that is relatively dynamic and thus more motile or capable of being more motile.

In other embodiments, the shape metric is an eccentricity value of a best fit ellipse. Like the minor axis/major axis aspect ratio, the eccentricity value feature gives an idea about the degree of deviation of the image from being circular. The linear eccentricity of an ellipse or hyperbola is the distance between its center and either of its two foci. Eccentricity is derived as follows:

eccentricity=$\{(a^2-b^2)^{1/2}\}/a$, where a and b are the major axis length and minor axis length of the equivalent best fit ellipses.

The eccentricity parameter may vary between 0 and 1. It equals zero when b equals a, that is when the ellipse is a circle. As the ellipse moves away from the circular shape and becomes flatter, 'a' assumes increasingly larger values with respect to the value of 'b,' and as such the fraction b/a decreases towards the 0 value, and the eccentricity value approaches 1.

In some embodiments, the shape metric is a circularity parameter. Circularity is a shape descriptor that can mathematically indicate the degree of similarity to a perfect circle. A value of 1.0 designates a perfect circle. As the circularity value approaches 0.0, the shape is increasingly less circular. Circularity can be defined by the equation:

$$4\pi * \frac{[\text{Area}]}{[\text{Perimeter}]^2},$$

where the area of the objects in binary image is a scalar whose value corresponds roughly to the total number of non-zero pixels in the image. A Hugh transform may be utilized to fit circles to an image. A circle is described by three parameters: radius r and the two center coordinates, $x_c$ and $y_c$: $r^2=(x-x_c)^2+(y-y_c)^2$. Therefore, the Hough space for circles is three-dimensional. The projection of an individual pixel $(x_k,y_k)$ into Hough space is a cone: If the pixel coordinates x and y as in the above equation are assumed to be fixed with $x=x_k$ and $y=y_k$, the above equation is satisfied by an infinite set of concentric circles with center $(x_k,y_k)$. The radius of the circles increases as the circles are translated along the r-axis. If a number of pixels that lie on a circle in image space are projected into Hough space, the ensuing cones meet at the point $(x_c,y_c,r)$. Accumulating votes along the cones (analogous to the sinusoidal traces in the line transform) will therefore yield a maximum at $(x_c,y_c,r)$ that can be used to reconstruct the circle.

In other embodiments, the shape metric is a roundness parameter. Roundness is similar to circularity but is insensitive to irregular borders along the perimeter of an object. Roundness also takes into consideration the major axis of the best fit ellipse. Roundness can be defined by the equation:

$$4 * \frac{[\text{Area}]}{\pi * [\text{Major axis}]^2}$$

In some embodiments, a Hough transform, or a randomized Hough transform may be used to derive a best fit ellipse, such as a best fit ellipse for each identified lymphocyte. As used herein, the term "ellipse shape" not only refers to an ellipse in the mathematical sense, but also includes the concept of a shape slightly deformed from an ellipse (such as an oval shape). The basic idea of Hough transform is to implement a voting procedure for all potential curves in an image, and at the termination of the algorithm, curves that do exist in the image will have relatively high voting scores. Said another way, the principal idea of the Hough transform is the accumulation of votes in parameter space, and the Hough Transform can be applied to both circles and ellipses, since both shapes can be described analytically. The Hough transform includes of three steps: (i) a pixel in the image is transformed into a parameterized curve; (ii) a valid curve's parameters are binned into an accumulator where the number of curves in a bin equals its score; and (iii) a curve with a maximum score is selected from the accumulator to represent a curve in the image. Methods of ellipse detection in an image are described by Yuen et. al., "Ellipse Detection Using the Hough Transform," AV 1998 doi: 10.5244/C.2.41, the disclosure of which is incorporated by reference herein in its entirety. Additional methods of performing a Hough transform are described in United States Patent Publication No. 2016/0196465, the disclosure of which is incorporated by reference herein in its entirety.

Randomized Hough transform is different from a "traditional" Hough transform in that it tries to avoid conducting the computationally expensive voting process for every non-zero pixel in the image by taking advantage of the geometric properties of analytical curves, and thus improve the time efficiency and reduce the storage requirement of the original algorithm. The Randomized Hough transform process generally consists of three steps: (i) fit ellipses with randomly selected points; (ii) update the accumulator array and corresponding scores; and (iii) output the ellipses with scores higher than some predefined threshold.

More specifically, Randomized Hough transform randomly selects n pixels from an image and fits them to a parameterized curve. If the pixels fit within a tolerance they are added to an accumulator with a score. Once a specified number of pixel sets are selected, the curves with the best score are selected from the accumulator and its parameters are used to represent a curve in the image. Because only a small random subset of pixels, n, are selected this method reduces the storage requirements and computational time needed to detect curves in an image. In a Randomized Hough transform, if a curve in the accumulator is similar to the curves being tested, the parameters of the curves are averaged together, and the new average curve replaces the curve in the accumulator. This reduces the difficulty of finding the local maxima in the Hough space because only one point in the Hough space represents a curve, instead of a clump of near points with a local maxima.

By way of example, an ellipse's parameters may be determined from an image starting from finding the center coordinates of the ellipse to determining the semi-major axis' length (a), semi-minor axis' length (b), and half the distance between the foci (c).

Step 1: Select three points, $X_1$, $X_2$, and $X_3$. Three points are randomly selected from the image such that each point has an equal opportunity to be chosen. Three sets of iterations of random numbers are generated from 1 to the length of the image in sub-indices to form sets of three points for each iteration. A sub-index is the number of a cell in a matrix and ranges from 1 to the number of cells in the matrix. This is an alternative form for specifying a matrix cell from the normal row, column form. Only unique random numbers generated for sub-indices are kept to better cover the image, because each iteration requires three random points. If, after throwing away duplicate points, there are not enough points for all iterations specified, random numbers are generated until there were enough. All numbers are kept from this second generation, even if they duplicate the first sets.

Step 2: Determine the equation of the line for each point where the line's slope is the gradient at the point: y=mx+b. This is done by checking the pixels around the point and performing a least squares line fit to them. By way of example, determining the point's line equation can be performed sing MATLAB 'Roipoly' to select points in a seven by seven region around the point of interest. From the coordinates of these points we use the 'polyfit' to find the slope $m_1$ and y-intercept $b_1$ for the point of interest.

Step 3: Determine the intersection of the tangents passing through point pairs $(X_1,X_2)$ and $(X_2,X_3)$. The tangent intersection points $t_{12}$ and $t_{23}$ are found by solving these systems of linear equations for the x and y coordinates:

Tangents $X_1$ and $X_2$ for $t_{12}$:

$$\begin{bmatrix} m_1 x + b_1 - y = 0 \\ m_2 x + b_2 - y = 0 \end{bmatrix}$$

Tangents $X_2$ and $X_3$ for $t_{23}$:

$$\begin{bmatrix} m_2 x + b_2 - y = 0 \\ m_3 x + b_3 - y = 0 \end{bmatrix}$$

Step 4: Calculate the bisector of the tangent intersection points. This is a line from the tangent's intersection, t, to the midpoint of the two points, m. The midpoint coordinate $m_{12}$ equals half the distance from $X_1$ to $X_2$. The midpoint coordinate and bisection coordinate $t_{12}$ are used to get the bisection line equation. This is found by solving the following equation to find the slope:

$$\text{slope} = \frac{m_y - t_y}{m_x - t_x}$$

and using the slope in the line equation to find the y-intercept:

b=slope*x−y=slope*tx−ty the bisection line is then: y=slope*x−b.

Step 5: Find the bisectors intersection to give the ellipse's center, O. The ellipse's center is located at the intersection of the bisectors. The intersection coordinates are found using the bisectors line equations determined in step 4 in the following system of linear equations.

Ellipse center located at (x,y) derived from:

$$\begin{bmatrix} m_1 x + b_1 - y = 0 \\ m_2 x + b_2 - y = 0 \end{bmatrix}$$

After an ellipse's center (p,q) has been determined, the semi-major axis length and the semi-minor axis length may be determined from the ellipse equation:

$A(x-p)^2+2B(x-p)(y-q)+C(y-q)^2=1$ using the three points randomly selected to create three linear equations with respect to A, B, and C. First, the ellipse is translated to the origin to reduce the ellipse equation to: $Ax^2+2Bxy+Cy^2=1$. This is done by subtracting p from x and q from y for the three points selected in the beginning $X_1$, $X_2$, and $X_3$.

Once the ellipse is translated to the origin, the following system of linear equations is solved to find the coefficients A, B, and C:

$$\begin{bmatrix} Ax_1^2 + 2Bx_1 y_1 + Cy_1^2 = 1 \\ Ax_2^2 + 2Bx_2 y_2 + Cy_2^2 = 1 \\ Ax_3^2 + 2Bx_3 y_3 + Cy_3^2 = 1 \end{bmatrix}$$

Next solve the following equations for the semi-major axis (a) and semi-minor axis (b):

$\text{semimajoraxis}(a) = \sqrt{|A^{-1}|}$ $\text{semiminor}(b) = \sqrt{|C^{-1}|}$ As an alternative to fitting an ellipse with a Hough transform or a Randomized Hough transform, a parameterless non-iterative ellipse fitting technique may be utilized, such as described by Petraucean et. al., "A Parameterless Line Segment and Elliptical Arc Detector with Enchanged Ellipse Fitting," http://ubee.enseeiht.filvision/ELSD/eccv2012-1D576.pdf, the disclosure of which is hereby incorporated by reference herein in its entirety. Petraucean describes an Ellipse and Line Segment Detector (ELSD) having three steps: (1) first, feature candidates are identified using a heuristic; (2) then each candidate has to pass a validation phase. Owing to the multiple families of features addressed, (3) a model selection step is required to choose the best geometric interpretation.

In other embodiments, the shape metric is a solidity parameter. Solidity describes the extent to which a shape is convex or concave. The solidity of a completely convex shape is 1, the farther the solidity deviates from 1, the greater the extent of concavity in the structure. Solidity can be defined by the equation:

$$\frac{[Area]}{[Convex\ area]}$$

Labeling Module

After the lymphocytes are identified and a shape metric derived for each lymphocyte, a labeling module 208 is used such that the identified lymphocytes may be annotated, labeled, or associated with data, and so that the generated data may be stored in database 240 (step 305). In some embodiments, the labeling module 208 may create a database 240 which is a non-transitory memory that stores data as noted herein. In some embodiments, the database 240 storages the images received as input, the coordinates of any lymphocytes (e.g. a center seed point of the lymphocyte or the coordinates of the outline of the lymphocyte), and any associated data or labels (e.g. derived shape metrics, other metrics such as the area of the lymphocyte or the data points used to calculate any shape metric, staining intensity values, expression scores, tumor cell and lymphocyte classifications, etc.).

In some embodiments, image analysis data describing individual pixels within any identified cell (e.g. a tumor cell or an identified lymphocyte). The skilled artisan will appreciate that the data of all pixels within a particular cell may be averaged to provide an average value of the pixel data within the cell. For example, individual pixels may each have a certain intensity. The intensity of all of the pixels with a particular identified tumor cell corresponding to a first marker may be averaged to provide an average pixel intensity for that marker within the tumor cell. Likewise, the intensity of all of the pixels with a particular identified lymphocyte cell corresponding to a second marker may be averaged to provide an average pixel intensity for that marker within the lymphocyte. That average pixel for the particular cell (or even group of cells or regions of interest) may be stored in database 240.

In some embodiments, the labeling module 208 may assign a predictive label to each identified lymphocyte. For example, based on the one or more derived shape metrics for each identified lymphocyte, the labeling module may assign a number (e.g. 1 through 10) or a letter (e.g. A through J) indicating on a sliding scale the likelihood that any particular identified lymphocyte is dynamic or motile. For example, using the above example, a value of A may mean that it is predictive that a particular identified lymphocyte is most likely to be motile; while a value of J may mean that it is predictive that a particular identified lymphocyte is least likely to be motile; where letters between A and J provide a step-wise indication of the likelihood that a particular identified lymphocyte is motile or not. In addition to assigning a letter or number, other indication may be assigned, such as "+" or "−."

To achieve the foregoing, the labeling module will make use of one or more predetermined shape value thresholds for each type of shape metric. For example, a predetermined threshold of an eccentricity value may be set to 0.65 and those identified lymphocytes with a derived eccentricity value of greater than 0.65 will be assigned a first motility label, while those having a derived eccentricity value of less than 0.65 will be assigned a second motility label. Of course, ranges of predetermined thresholds may be established, e.g. 0.0 to 0.2; 0.21 to 0.4; 0.41 to 0.6; 0.61 to 0.8; and 0.81 to 1.0, where derived shape metric values for each identified lymphocyte will be compared to the ranges and a label assigned depending on the range in which the derived value falls into.

As an example of the data that may be generated by the labeling module 208 and stored within database 240 for a particular identified lymphocyte may include: x,y coordinates of the seed center of the lymphocyte; x,y coordinates of an entire outline of a lymphocyte; a calculated area of the lymphocyte; a first derived shape metric; a second derived shape metric; a data point used in calculating either the first or second derived shape metrics; a classification of the lymphocyte as a cytotoxic T cell, a helper T cell, etc.; a predictive label of whether the identified lymphocyte is likely or unlikely to be dynamic or motile; the overall density of lymphocytes within a predefined area of the image, within an entire tissue area, or of the whole slide.

Overlay Generation Module

The skilled artisan will appreciate that the stored analysis results and associated biological features can be later retrieved, and the data may be reported or visualized in various formats. More specifically, the coordinate data of each lymphocyte as well as the derived shape metric for each lymphocyte may be retrieved from the database 240 (along with any other data) such that informative visual representations may be made using an overlay generation module 209. These visualizations are intended to assist a pathologist or histologist in the analysis of a biological sample. In some embodiments, the generated overlay may be generated for a whole slide image, a particular tissue region or area (such as a tissue region which is believed to be rich in lymphocytes, TILs, or tumor tissue), or based on an area annotated by a pathologist or histologist for further review (e.g. such as after reviewing the stained slides under a microscope, or one of more serial sections, such as sections stained for the presence of one or more biomarkers and/or a section stained with a primary stain and a counterstain).

Figure 7A:
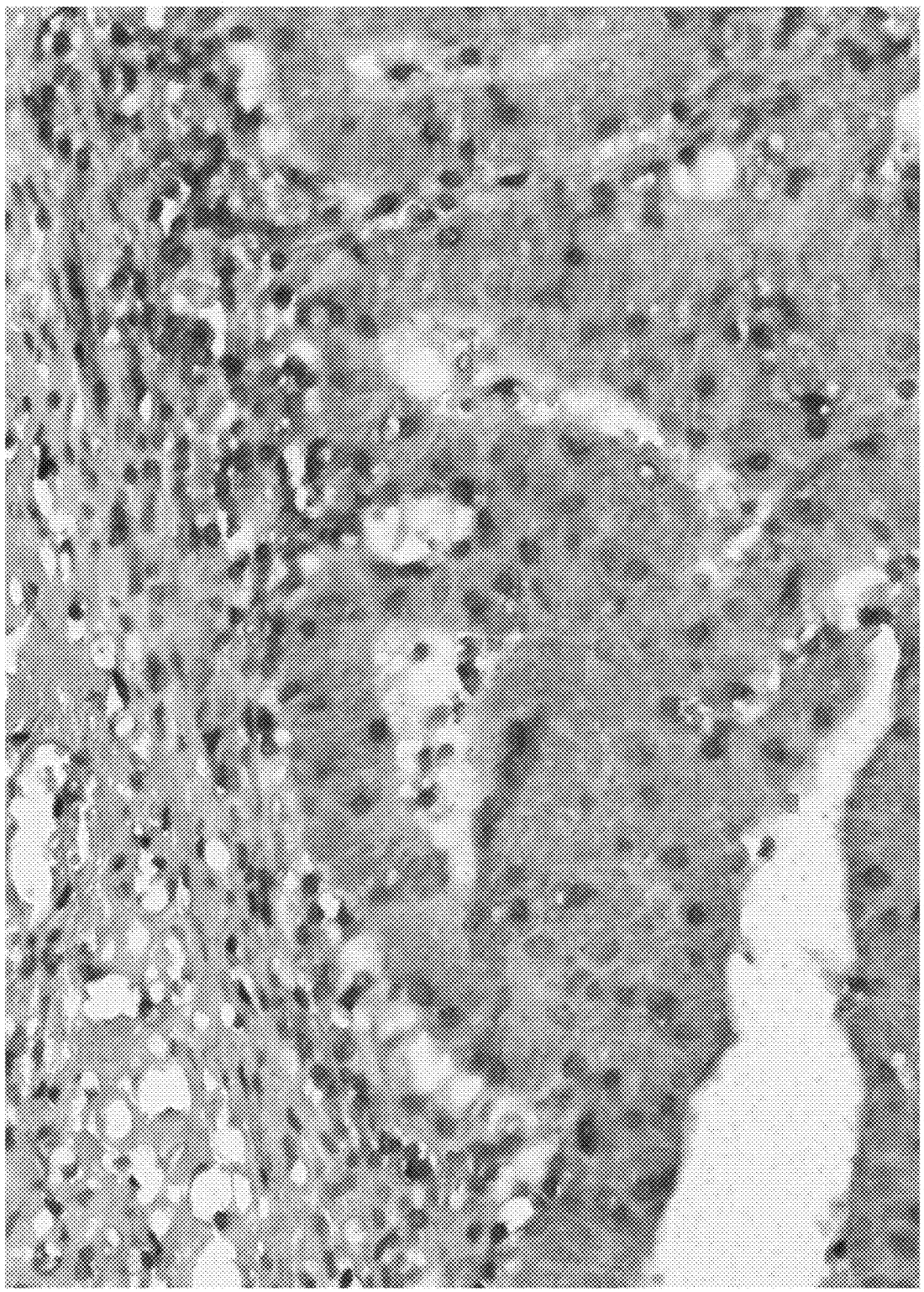
FIG. 7A illustrates a region of a tissue sample of colorectal cancer stained with CD3/red and Perforin/DAB. T-cells stain with a red membrane (brightfield).
Figure 7B:
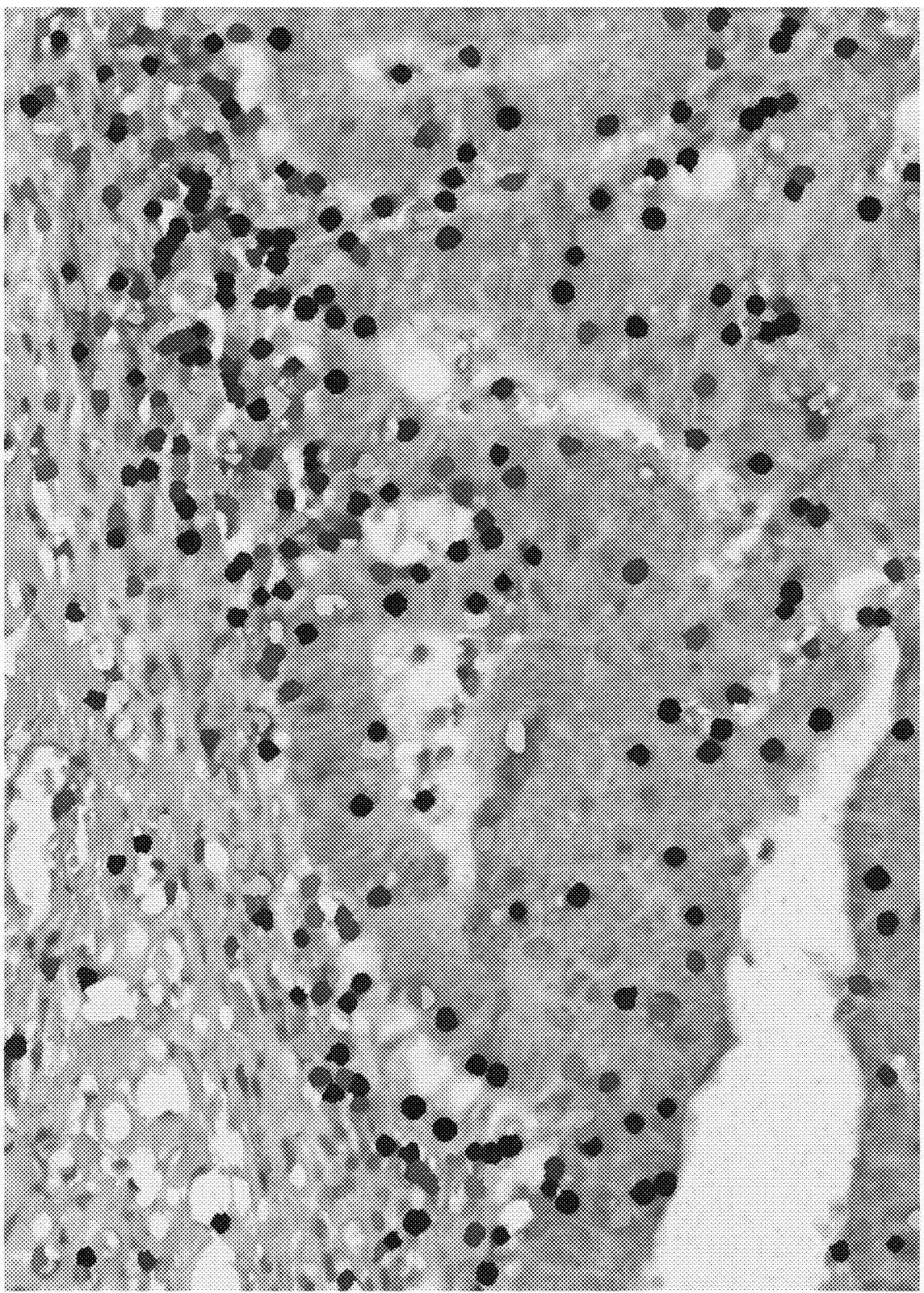
FIG. 7B illustrates a segmentation and detection result for lymphocytes. The color overlay shows different cells in different colors.
Figure 8A:
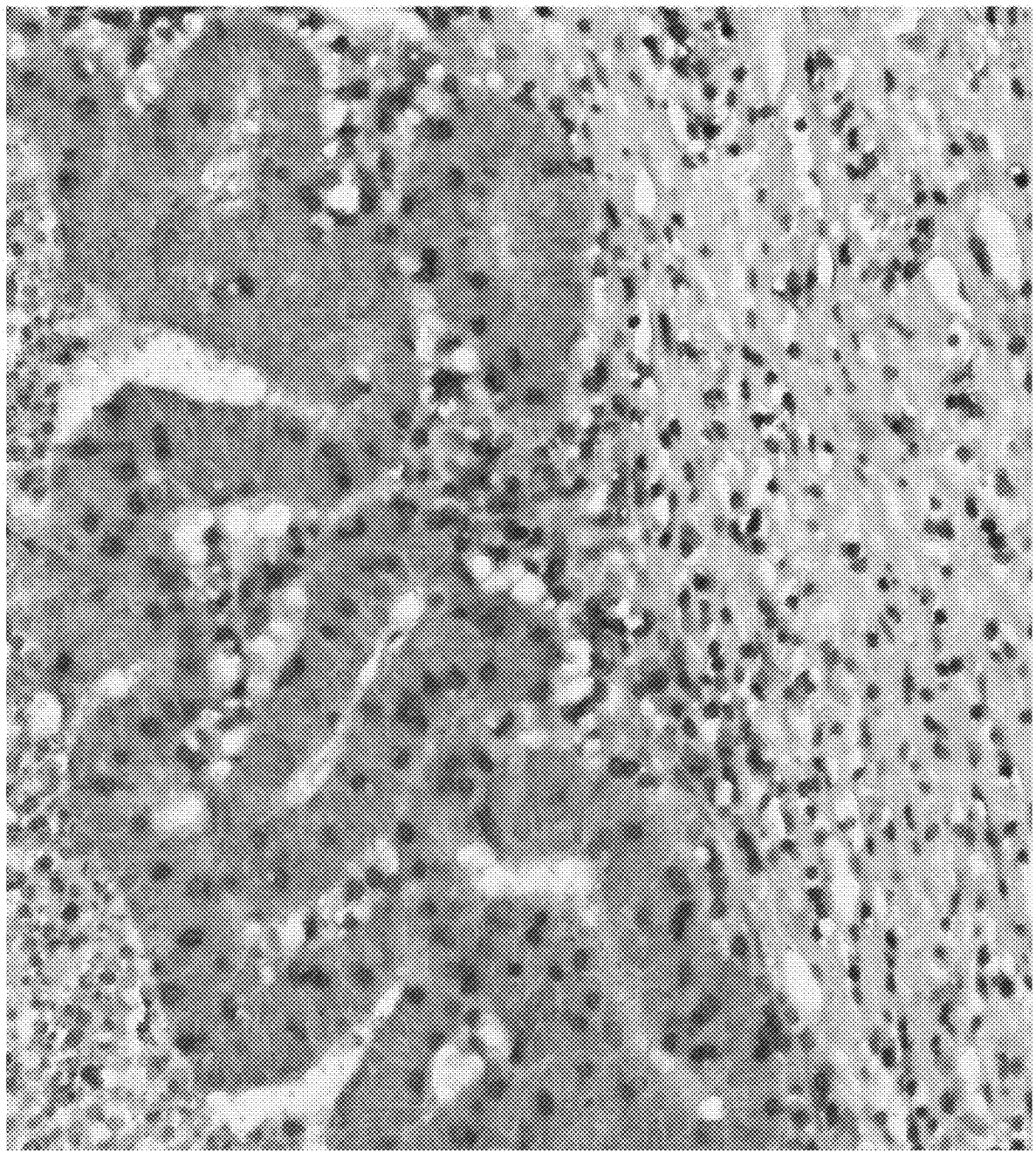
FIG. 8A illustrates a region of a tissue sample of colorectal cancer, stained with CD3/red and Perforin/DAB. T-cells stain with a red membrane (brightfield).
Figure 8B:
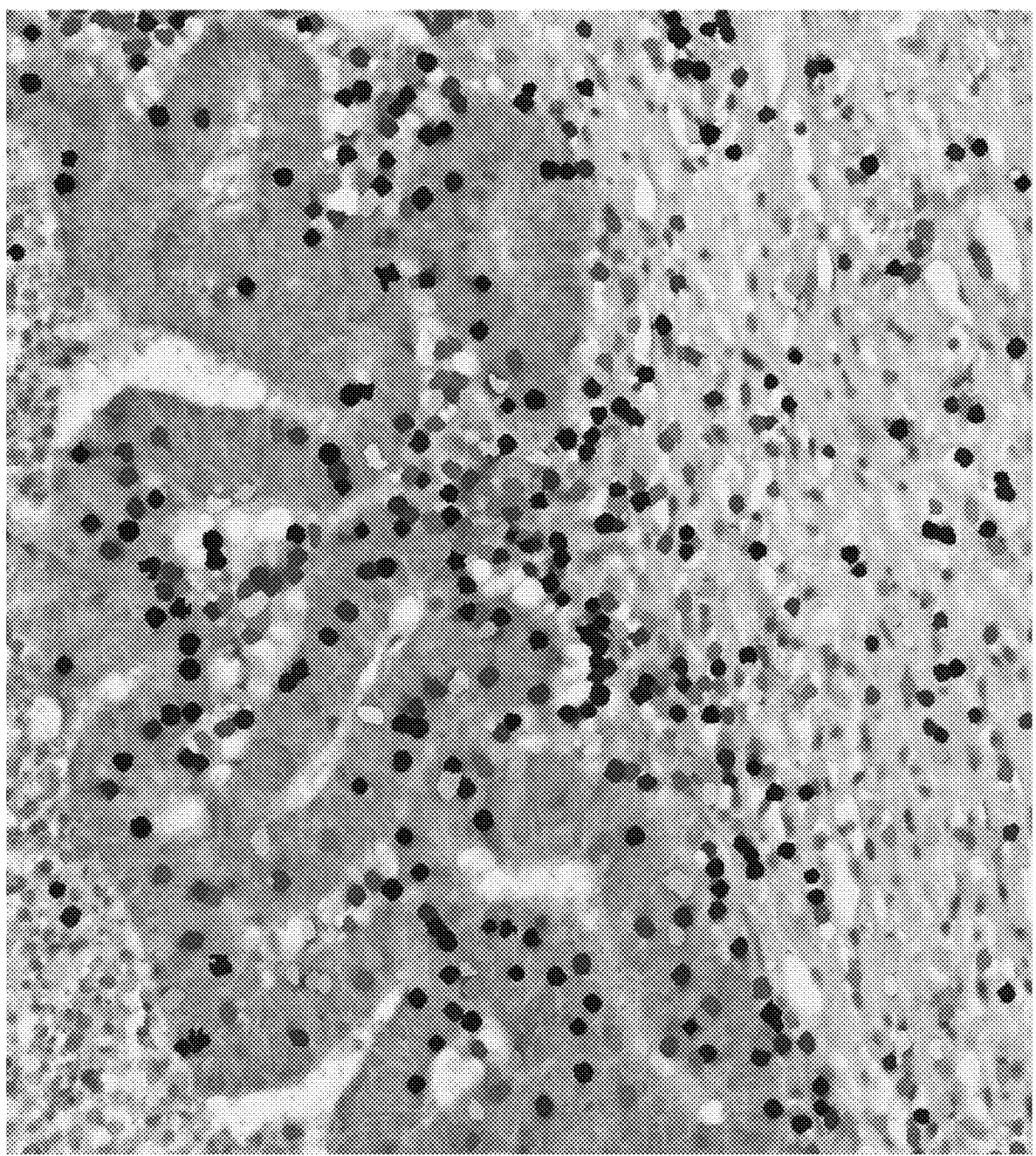
FIG. 8B illustrates a segmentation and detection result for lymphocytes. Color coding indicates cell shape and motility from dark blue (stationary) to deep red (dynamic).
Figure 9A:
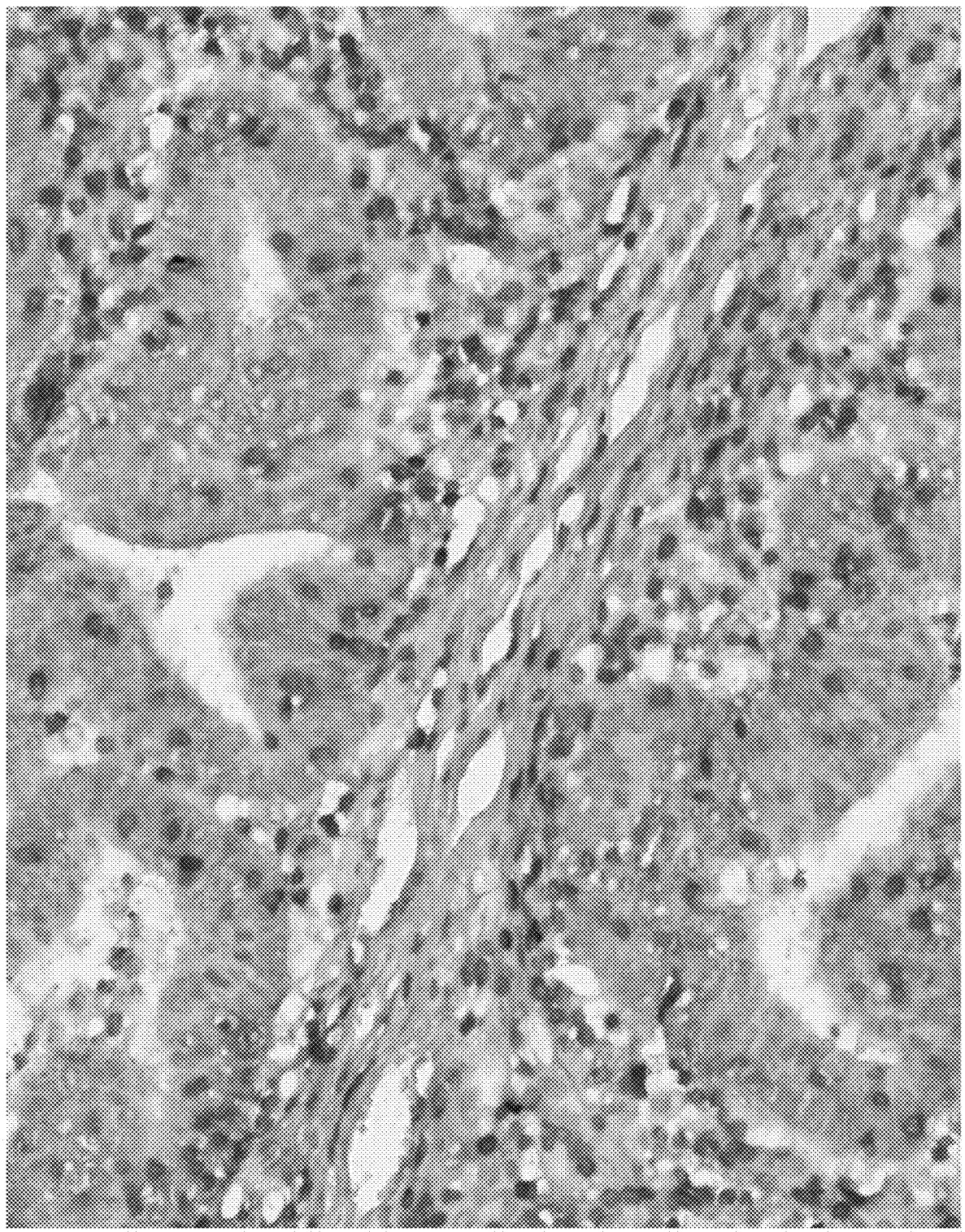
FIG. 9A illustrates a region of a tissue sample of colorectal cancer, stained with CD3/red and Perforin/DAB. T-cells stain with a red membrane (brightfield).
Figure 9B:
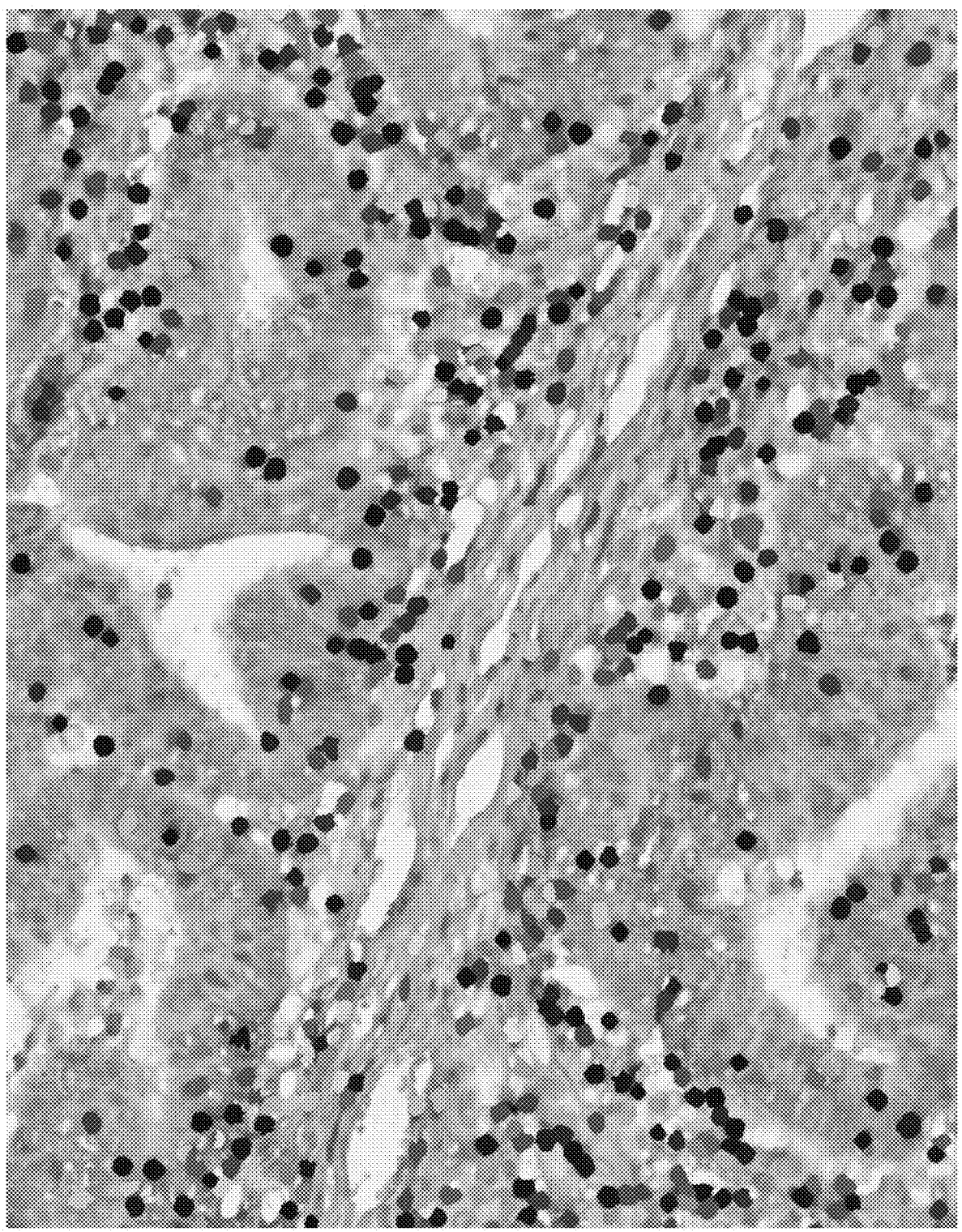
FIG. 9B illustrates a segmentation and detection result for lymphocytes. Color coding indicates cell shape and motility from dark blue (stationary) to deep red (dynamic).

Such visualizations are shown in FIGS. 7B, 8B, and 9B, where lymphocytes are identified from other cells or tissue, and the color (or the intensity of the color) provides feedback as to whether an identified lymphocyte is elongate or more round. A pathologist or histologist may be able to decipher the visualization and provide an analysis in a comparatively quicker manner than if that same pathologist or histologist had to go through the tedious task of manually identifying lymphocytes and manually ascertaining each's shape. Not only is the task of identifying lymphocytes and their shape ascertained more quickly, it is believed that the systems and methods herein facilitate a more accurate method of identifying lymphocytes and their shape.

In some embodiments, identified lymphocytes are traced. For example, an algorithm may be employed which traces the exterior boundary of an outline of a lymphocyte, such as based on the generated foreground segmentation mask (from step 303). In some embodiments, the outlines may be traced using a matlab function called bwboundaries (https://www-.mathworks.com/help/images/ref/bwboundaries.html). The boundary outlines may be each represented using a separate color or other indicia, where each separate color or other indicia represents a range of values for a recorded derived shape metric. By way of a non-limiting example, lymphocytes having an eccentricity value of between 0.8 and 1.0 may be traced in purple; those lymphocytes having an eccentricity value of between 0.7 and 0.79 may be traced in dark blue; those lymphocytes having an eccentricity value of between 0.6 and 0.69 may be traced in light blue; those lymphocytes having an eccentricity value of between 0.5 and 0.59 may be traced in green; those lymphocytes having an eccentricity value of between 0.4 and 0.49 may be traced in yellow; those lymphocytes having an eccentricity value of between 0.3 and 0.39 may be traced in orange; and those lymphocytes having an eccentricity value of between 0.0 and 0.29 may be traced in red. Of course, and in addition to tracing the outlines of any identified lymphocyte, the boundary created may be filled with a color or other indicia.

In some embodiments, each identified lymphocyte is visualized with a seed point, such as one centered within each identified lymphocyte. Seed points are derived by calculating a centroid or center of mass of each identified lymphocyte (such as based on a derived area of the lymphocyte). Methods of determining centroids of irregular objects are known to those of ordinary skill in the art. Once calculated, the centroid of the lymphocyte is labeled (in addition, the x,y coordinates of the seed point may be stored in a memory or database 240). In some embodiments, the position of the centroid or center of mass may be superimposed on the input image, which may again be a whole slide image or any portion thereof.

Scoring Module

In some embodiments, derived stain intensity values, counts of specific nuclei, or other classification results may be used to determine various marker expression scores, such as percent positivity, an Allred score, or an H-Score, using scoring module 210. Methods for scoring are described in further detail in commonly-assigned and co-pending applications WO/2014/102130A1 "Image analysis for breast cancer prognosis" filed Dec. 19, 2013, and WO/2014/140085A1 "Tissue object-based machine learning system for automated scoring of digital whole slides," filed Mar. 12, 2104, the contents of each are hereby incorporated by reference in their entirety herein. For example, based at least in part on the number of biomarker-positive tumor cells/biomarker-positive non-tumor cells, a score (e.g., a whole-slide score, or a score for an annotated area of an image, such as an area annotated by a pathologist or histologist) can be determined. In some embodiments, for each detected nuclear blob, average blob intensity, color and geometric features, such as area and shape of the detected nuclear blob may be computed, and the nuclear blobs are classified into tumor nuclei and nuclei of non-tumor cells. The number of identified nuclei output corresponds to the total number of biomarker-positive tumor cells detected in a region, as evidenced by the number of tumor nuclei counted. Other methods of scoring a sample are described in PCT Publication No. WO/2017/093524, and US Patent Publication Nos. 2017/0103521 and 2017/0270666, the disclosures of which are hereby incorporated by reference herein in their entireties.

In embodiments where the samples are stained for the presence of a lymphocyte biomarker and also for the presence of PD-L1, PD-L1 expression may be scored by: (a) identifying tumor cells and lymphocytes in the tumor sample; (b) determining the number of tumor cells and lymphocytes expressing PD-L1 and/or the relative intensity of PD-L1 expression in said cells; and (c) categorizing the tumor according to the PD-L1 expression determined in (b). In some embodiments, the expression of PD-L1 is determined by specifically detecting PD-L1 protein and/or PD-L1 mRNA in the tumor. In some embodiments, the cells are considered to express PD-L1 when the cell has at least partial membrane staining of PD-L1 protein detected by IHC. In some embodiments, the tumor is categorized according to one or both of a modified H-score (MHS) or a modified proportion score (MPS), both computed from step (b) (see US Publication No. 2017/0372117 for additional information, the disclosure of which is hereby incorporated by reference herein in its entirety).

The H-score is, for example, a method of assessing the extent of nuclear immunoreactivity. In dependence on the biomarker, different approaches for H-score calculation may be used. To give an illustrative example, the H-score for steroid receptor nuclei can be obtained by the formula: 3× percentage of strongly staining nuclei+2× percentage of moderately staining nuclei+percentage of weakly staining nuclei, giving a range of 0 to 300.

In some embodiments, assigning the MHS comprises (i) estimating, across all of the viable tumor cells and stained mononuclear inflammatory cells in all of the examined tumor nests, four separate percentages for cells that have no staining, weak staining (+1), moderate staining (+2) and strong staining (+3), wherein a cell must have at least partial membrane staining to be included in the weak, moderate or strong staining percentages, and wherein the sum of all four percentages equals 100; and (ii) inputting the estimated percentages into the formula of 1×(percent of weak staining cells)+2×(percent of moderate staining cells)+3×(percent of strong staining cells), and assigning the result of the formula to the tissue section as the MHS; wherein assigning the MPS comprises estimating, across all of the viable tumor cells and mononuclear inflammatory cells in all of the examined tumor nests, the percentage of cells that have at least partial membrane staining of any intensity, and assigning the resulting percentage to the tissue section as the MPS; and wherein if both the MHS and MPS are assigned, the assignments may be made in either order or simultaneously. For example, the four categories "no", "weak", "moderate" and "strong" may be defined, for example, as non-overlapping intensity threshold ranges; for example, a cell pixel region may be considered as a cell with "no staining" if the average intensity value is less than 5%, as a cell with "weak staining" if the average intensity value is >5% and <25%, as a cell with "moderate staining" if the average intensity value is >=25% and <75%, and as a cell with "strong staining" if the average intensity value is >=75%.

In some embodiments, the expression score is an Allred score. The Allred score is a scoring system which looks at the percentage of cells that test positive for hormone receptors, along with how well the receptors show up after staining (this is called "intensity"). This information is then combined to score the sample on a scale from 0 to 8. The higher the score, the more receptors are found and the easier they are to see in the sample.

In other embodiments, the expression score is percent positivity. Again, in the context of scoring a breast cancer sample stained for the PR and Ki-67 biomarkers, for the PR and Ki-67 slides, the percent positivity is calculated (e.g., the total number of nuclei of cells (e.g., malignant cells) that are stained positive in each field of view in the digital image of a slide are summed and divided by the total number of positively and negatively stained nuclei from each of the fields of view of a digital image) in a single slide as follows: Percent positivity=number of positively stained cells/(number of positively stained cells+number of negatively stained cells).

Other Components for Practicing Embodiments of the Present Disclosure

The system 200 of the present disclosure may be tied to a specimen processing apparatus that can perform one or more preparation processes on the tissue specimen. The preparation process can include, without limitation, deparaffinizing a specimen, conditioning a specimen (e.g., cell conditioning), staining a specimen, performing antigen retrieval, performing immunohistochemistry staining (including labeling) or other reactions, and/or performing in situ hybridization (e.g., SISH, FISH, etc.) staining (including labeling) or other reactions, as well as other processes for preparing specimens for microscopy, microanalyses, mass spectrometric methods, or other analytical methods.

The processing apparatus can apply fixatives to the specimen. Fixatives can include cross-linking agents (such as aldehydes, e.g., formaldehyde, paraformaldehyde, and glutaraldehyde, as well as non-aldehyde cross-linking agents), oxidizing agents (e.g., metallic ions and complexes, such as osmium tetroxide and chromic acid), protein-denaturing agents (e.g., acetic acid, methanol, and ethanol), fixatives of unknown mechanism (e.g., mercuric chloride, acetone, and picric acid), combination reagents (e.g., Carnoy's fixative, methacarn, Bouin's fluid, B5 fixative, Rossman's fluid, and Gendre's fluid), microwaves, and miscellaneous fixatives (e.g., excluded volume fixation and vapor fixation).

If the specimen is a sample embedded in paraffin, the sample can be deparaffinized using appropriate deparaffinizing fluid(s). After the paraffin is removed, any number of substances can be successively applied to the specimen. The substances can be for pretreatment (e.g., to reverse protein-crosslinking, expose nucleic acids, etc.), denaturation, hybridization, washing (e.g., stringency wash), detection (e.g., link a visual or marker molecule to a probe), amplifying (e.g., amplifying proteins, genes, etc.), counterstaining, coverslipping, or the like.

The specimen processing apparatus can apply a wide range of substances to the specimen. The substances include, without limitation, stains, probes, reagents, rinses, and/or conditioners. The substances can be fluids (e.g., gases, liquids, or gas/liquid mixtures), or the like. The fluids can be solvents (e.g., polar solvents, non-polar solvents, etc.), solutions (e.g., aqueous solutions or other types of solutions), or the like. Reagents can include, without limitation, stains, wetting agents, antibodies (e.g., monoclonal antibodies, polyclonal antibodies, etc.), antigen recovering fluids (e.g., aqueous- or non-aqueous-based antigen retrieval solutions, antigen recovering buffers, etc.), or the like. Probes can be an isolated nucleic acid or an isolated synthetic oligonucleotide, attached to a detectable label or reporter molecule. Labels can include radioactive isotopes, enzyme substrates, co-factors, ligands, chemiluminescent or fluorescent agents, haptens, and enzymes.

The specimen processing apparatus can be an automated apparatus, such as the BENCHMARK XT instrument and SYMPHONY instrument sold by Ventana Medical Systems, Inc. Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. Published Patent Application Nos. 20030211630 and 20040052685, each of which is incorporated herein by reference in its entirety. Alternatively, specimens can be manually processed.

After the specimens are processed, a user can transport specimen-bearing slides to the imaging apparatus. In some embodiments, the imaging apparatus is a brightfield imager slide scanner. One brightfield imager is the iScan HT and DP200 (Griffin) brightfield scanner sold by Ventana Medical Systems, Inc. In automated embodiments, the imaging apparatus is a digital pathology device as disclosed in International Patent Application No.: PCT/US2010/002772 (Patent Publication No.: WO/2011/049608) entitled IMAGING SYSTEM AND TECHNIQUES or disclosed in U.S. Patent Application No. 61/533,114, filed on Sep. 9, 2011, entitled IMAGING SYSTEMS, CASSETTES, AND METHODS OF USING THE SAME. International Patent Application No. PCT/US2010/002772 and U.S. Patent Application No. 61/533,114 are incorporated by reference in their entities.

The imaging system or apparatus may be a multispectral imaging (MSI) system or a fluorescent microscopy system. The imaging system used here is an MSI. MSI, generally, equips the analysis of pathology specimens with computerized microscope-based imaging systems by providing access to spectral distribution of an image at a pixel level. While there exists a variety of multispectral imaging systems, an operational aspect that is common to all of these systems is a capability to form a multispectral image. A multispectral image is one that captures image data at specific wavelengths or at specific spectral bandwidths across the electromagnetic spectrum. These wavelengths may be singled out by optical filters or by the use of other instruments capable of selecting a pre-determined spectral component including electromagnetic radiation at wavelengths beyond the range of visible light range, such as, for example, infrared (IR).

An MSI system may include an optical imaging system, a portion of which contains a spectrally-selective system that is tunable to define a pre-determined number N of discrete optical bands. The optical system may be adapted to image a tissue sample, illuminated in transmission with a broadband light source onto an optical detector. The optical imaging system, which in one embodiment may include a magnifying system such as, for example, a microscope, has a single optical axis generally spatially aligned with a single optical output of the optical system. The system forms a sequence of images of the tissue as the spectrally selective system is being adjusted or tuned (for example with a computer processor) such as to assure that images are acquired in different discrete spectral bands. The apparatus may additionally contain a display in which appears at least one visually perceivable image of the tissue from the sequence of acquired images. The spectrally-selective system may include an optically-dispersive element such as a diffractive grating, a collection of optical filters such as thin-film interference filters or any other system adapted to select, in response to either a user input or a command of the pre-programmed processor, a particular pass-band from the spectrum of light transmitted from the light source through the sample towards the detector.

An alternative implementation, a spectrally selective system defines several optical outputs corresponding to N discrete spectral bands. This type of system intakes the transmitted light output from the optical system and spatially redirects at least a portion of this light output along N spatially different optical paths in such a way as to image the sample in an identified spectral band onto a detector system along an optical path corresponding to this identified spectral band.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Any of the modules described herein may include logic that is executed by the processor(s). "Logic," as used herein, refers to any information having the form of instruction signals and/or data that may be applied to affect the operation of a processor. Software is an example of logic.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks). For example, the network 20 of FIG. 1 can include one or more local area networks.

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

All the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

Although the present disclosure has been described with reference to several illustrative embodiments, it should be understood that many other modifications and embodiments can be devised by those skilled in the art that will fall within the spirit and scope of the principles of this disclosure. More particularly, reasonable variations and modifications are possible in the component parts and/or arrangements of the subject combination arrangement within the scope of the foregoing disclosure, the drawings, and the appended claims without departing from the spirit of the disclosure. In addition to variations and modifications in the component parts and/or arrangements, alternative uses will also be apparent to those skilled in the art.

The invention claimed is:

1. A computer-implemented method comprising:
accessing an image of a stained biological sample;
processing the image to generate predictive cell motility labels for the image, wherein the image is processed by:
detecting, using a trained classifier, lymphocytes in the image;
identifying outlines of the lymphocytes by applying image enhancing filters to the image, wherein applying the image enhancing filters to the image causes one or more regions of the image to be discarded and one or more regions of the image to be retained;
computing shape metrics for the lymphocytes based on the outlines, wherein a shape metric of the shape metrics is computed for each lymphocyte of the lymphocytes;
for each respective lymphocyte of the lymphocytes, assigning a respective predictive cell motility label of a plurality of predictive cell motility labels to the respective lymphocyte based on a respective shape metric of the shape metrics, the respective shape metric indicative of a shape of the respective lymphocyte, wherein the respective predictive cell motility label corresponds to a letter and/or number that identifies a likelihood that the respective lymphocyte is motile; and
generating an overlay for the image using the predictive cell motility labels, wherein the overlay provides a visualization of the lymphocytes and predicted motilities of the lymphocytes.

2. The method of claim 1, wherein the shape metric comprises a minor axis/major axis aspect ratio of a best fit ellipse.

3. The method of claim 1, wherein the shape metric comprises an eccentricity value of a best fit ellipse.

4. The method of claim 1, wherein the shape metric comprises a circularity parameter.

5. The method of claim 1, wherein the shape metric comprises a roundness parameter.

6. The method of claim 1, wherein the shape metric comprises a solidity parameter.

7. The method of claim 1, wherein assigning the respective predictive cell motility label of the plurality of predictive cell motility labels to the respective lymphocyte based on a respective shape metric of the shape metrics comprises comparing a value associated with the shape metric to a predetermined threshold value.

8. A system comprising:
a processor, and
a computer-readable medium storing instructions which, when executed by the processor, cause the system to perform operations comprising:
accessing an image of a stained biological sample;
processing the image to generate predictive cell motility labels for the image,
wherein the image is processed by:
detecting, using a trained classifier, lymphocytes in the image;
identifying outlines of the lymphocytes by applying image enhancing filters to the image, wherein applying the image enhancing filters to the image causes one or more regions of the image to be discarded and one or more regions of the image to be retained;
computing shape metrics for the lymphocytes based on the outlines, wherein a shape metric of the shape metrics is computed for each lymphocyte of the lymphocytes;
for each respective lymphocyte of the lymphocytes, assigning a respective predictive cell motility label of a plurality of predictive cell motility labels to the respective lymphocyte based on a respective shape metric of the shape metrics, the respective shape metric indicative of a shape of the respective lymphocyte, wherein the respective predictive cell motility label corresponds to a letter and/or number that identifies a likelihood that the respective lymphocyte is motile; and generating an overlay for the image using the predictive cell motility labels, wherein the overlay provides a visualization of the lymphocytes and predicted motilities of the lymphocytes.

9. The system of claim 8, wherein the shape metric comprises a minor axis/major axis aspect ratio of a best fit ellipse.

10. The system of claim 8, wherein the shape metric comprises an eccentricity value of a best fit ellipse.

11. The system of claim 8, wherein the shape metric comprises a circularity parameter.

12. The system of claim 8, wherein the shape metric comprises a roundness parameter.

13. The system of claim 8, wherein the shape metric comprises a solidity parameter.

14. The system of claim 8, wherein assigning the respective predictive cell motility label of the plurality of predictive cell motility labels to the respective lymphocyte based on a respective shape metric of the shape metrics comprises comparing a value associated with the shape metric to a predetermined threshold value.

15. A non-transitory computer-readable medium storing instructions which, when executed by a processor, cause a system device to perform a method comprising:
  accessing an image of a stained biological sample;
  processing the image to generate predictive cell motility labels for the image, wherein the image is processed by:
    detecting, using a trained classifier, lymphocytes in the image;
    identifying outlines of the lymphocytes by applying image enhancing filters to the image, wherein applying the image enhancing filters to the image causes one or more regions of the image to be discarded and one or more regions of the image to be retained;
    computing shape metrics for the lymphocytes based on the outlines, wherein a shape metric of the shape metrics is computed for each lymphocyte of the lymphocytes;
    for each respective lymphocyte of the lymphocytes, assigning a respective predictive cell motility label of a plurality of predictive cell motility labels to the respective lymphocyte based on a respective shape metric of the shape metrics, the respective shape metric indicative of a shape of the respective lymphocyte, wherein the respective predictive cell motility label corresponds to a letter and/or number that identifies a likelihood that the respective lymphocyte is motile; and
  generating an overlay for the image using the predictive cell motility labels, wherein the overlay provides a visualization of the lymphocytes and predicted motilities of the lymphocytes.

16. The non-transitory computer-readable medium of claim 15, wherein the shape metric comprises a minor axis/major axis aspect ratio of a best fit ellipse.

17. The non-transitory computer-readable medium of claim 15, wherein the shape metric comprises an eccentricity value of a best fit ellipse.

18. The non-transitory computer-readable medium of claim 15, wherein the shape metric comprises a circularity parameter.

19. The non-transitory computer-readable medium of claim 15, wherein the shape metric comprises a roundness parameter.

20. The non-transitory computer-readable medium of claim 15, wherein the shape metric comprises a solidity parameter.

* * * * *